United States Patent
Li et al.

(10) Patent No.: US 10,059,037 B2
(45) Date of Patent: Aug. 28, 2018

(54) INSULATED CONTAINER AND METHODS OF MAKING AND ASSEMBLING

(71) Applicant: DART CONTAINER CORPORATION, Mason, MI (US)

(72) Inventors: Chengtao Li, Novi, MI (US); Gary R. Wilkes, Mason, MI (US); Wayne J. Myer, Mason, MI (US); Peter Matysiak, Dansville, MI (US)

(73) Assignee: Dart Container Corporation, Mason, MI (US)

( * ) Notice: Subject to any disclaimer, the term of this patent is extended or adjusted under 35 U.S.C. 154(b) by 18 days.

(21) Appl. No.: 14/861,465

(22) Filed: Sep. 22, 2015

(65) Prior Publication Data

US 2016/0082692 A1     Mar. 24, 2016

Related U.S. Application Data

(60) Provisional application No. 62/054,142, filed on Sep. 23, 2014, provisional application No. 62/189,527, filed on Jul. 7, 2015.

(51) Int. Cl.
*B32B 7/02* (2006.01)
*B29B 17/00* (2006.01)
(Continued)

(52) U.S. Cl.
CPC ...... *B29B 17/0005* (2013.01); *B29B 17/0026* (2013.01); *B29C 47/0021* (2013.01); *B29C 47/0042* (2013.01); *B29C 47/0047* (2013.01); *B29C 47/0057* (2013.01); *B29C 47/0064* (2013.01); *B29C 47/0066* (2013.01); *B29C 47/0069* (2013.01); *B29C 47/065* (2013.01); *B29C 47/56* (2013.01); *B29C 47/92* (2013.01);
(Continued)

(58) Field of Classification Search
CPC ..... B32B 5/18; B32B 27/065; B32B 2250/02; B65D 81/3867; B65D 3/12; B65D 3/16
USPC .................................................. 428/158, 212
See application file for complete search history.

(56) References Cited

U.S. PATENT DOCUMENTS

| | | |
|---|---|---|
| 1,814,671 A | 7/1931 | Dufour |
| 2,602,383 A | 7/1952 | Barbieri |

(Continued)

FOREIGN PATENT DOCUMENTS

| | | | | |
|---|---|---|---|---|
| CN | 101353101 A | | 1/2009 | |
| CN | 102329405 A | * | 1/2012 | ............. B29C 47/92 |

(Continued)

OTHER PUBLICATIONS

Machine Translation of JP 2002-019056.*

(Continued)

*Primary Examiner* — Maria V Ewald
*Assistant Examiner* — Zachary M Davis
(74) *Attorney, Agent, or Firm* — McGarry Bair PC

(57) ABSTRACT

A multi-layer sheet for forming an expanded foam container, the multi-layer sheet including a first layer of an expanded foam material including a first polyolefin-based material including at least one polypropylene-based polymer and a second layer of an unexpected material including a second polyolefin-based material including at least one polypropylene-based polymer that is co-extruded, extrusion coated, or laminated on a first side of the first layer.

59 Claims, 15 Drawing Sheets

(51) Int. Cl.

| | | |
|---|---|---|
| *B29C 47/00* | (2006.01) | |
| *B32B 5/18* | (2006.01) | |
| *B32B 27/06* | (2006.01) | |
| *B32B 27/18* | (2006.01) | |
| *B32B 27/32* | (2006.01) | |
| *B65D 21/02* | (2006.01) | |
| *B65D 81/38* | (2006.01) | |
| *B65D 3/12* | (2006.01) | |
| *B65D 3/16* | (2006.01) | |
| *B29C 47/56* | (2006.01) | |
| *B29C 47/06* | (2006.01) | |
| *B29C 47/92* | (2006.01) | |
| *B29L 9/00* | (2006.01) | |
| *B29L 31/00* | (2006.01) | |
| *B29C 47/14* | (2006.01) | |
| *B29C 47/26* | (2006.01) | |

(52) U.S. Cl.
CPC .............. *B32B 5/18* (2013.01); *B32B 27/065* (2013.01); *B32B 27/18* (2013.01); *B32B 27/32* (2013.01); *B65D 3/12* (2013.01); *B65D 3/16* (2013.01); *B65D 21/0209* (2013.01); *B65D 81/3867* (2013.01); *B29C 47/145* (2013.01); *B29C 47/261* (2013.01); *B29C 2947/922* (2013.01); *B29C 2947/92247* (2013.01); *B29C 2947/92285* (2013.01); *B29C 2947/92904* (2013.01); *B29K 2623/12* (2013.01); *B29K 2995/0015* (2013.01); *B29L 2009/00* (2013.01); *B29L 2009/005* (2013.01); *B29L 2031/7132* (2013.01); *B32B 2250/242* (2013.01); *B32B 2266/025* (2013.01); *B32B 2266/08* (2013.01); *B32B 2307/304* (2013.01); *B32B 2307/31* (2013.01); *B32B 2307/546* (2013.01); *B32B 2307/718* (2013.01); *B32B 2307/72* (2013.01); *B32B 2439/00* (2013.01); *B32B 2439/70* (2013.01); *B65D 21/0233* (2013.01)

(56) References Cited

U.S. PATENT DOCUMENTS

| | | |
|---|---|---|
| 2,969,901 A | 1/1961 | Behrens |
| 3,220,902 A | 11/1965 | Edwards |
| 3,420,397 A | 1/1969 | Miller |
| 3,485,412 A | 12/1969 | Hawley |
| 3,637,458 A | 1/1972 | Parrish |
| 3,658,615 A | 4/1972 | Amberg |
| 3,673,033 A | 6/1972 | MacDaniel et al. |
| 3,854,583 A | 12/1974 | Amberg et al. |
| 3,919,368 A | 11/1975 | Seto |
| 3,931,378 A | 1/1976 | Goehring |
| 3,931,380 A | 1/1976 | Belivakici et al. |
| 3,970,492 A | 7/1976 | Amberg et al. |
| 4,053,346 A | 10/1977 | Amberg et al. |
| 4,072,549 A | 2/1978 | Amberg et al. |
| 4,090,905 A | 5/1978 | Amberg et al. |
| 4,106,397 A | 8/1978 | Amberg et al. |
| 4,239,727 A | 12/1980 | Myers et al. |
| 4,506,037 A | 3/1985 | Suzuki et al. |
| 4,522,955 A | 6/1985 | Fukushima et al. |
| 4,650,816 A | 3/1987 | Bertrand |
| 5,026,338 A | 6/1991 | Blackwelder et al. |
| 5,062,568 A | 11/1991 | Hill et al. |
| 5,082,608 A | 1/1992 | Karabedian et al. |
| 5,116,881 A | 5/1992 | Park et al. |
| 5,149,579 A | 9/1992 | Park et al. |
| 5,176,607 A | 1/1993 | Hill et al. |
| 5,180,751 A | 1/1993 | Park et al. |
| 5,284,540 A | 2/1994 | Roth et al. |
| 5,310,584 A | 5/1994 | Jacoby et al. |
| 5,362,436 A | 11/1994 | Wagner |
| 5,605,936 A | 2/1997 | DeNicola, Jr. et al. |
| 5,628,453 A | 5/1997 | MacLaughlin |
| 5,690,527 A | 11/1997 | Rutledge et al. |
| 5,766,709 A | 6/1998 | Geddes et al. |
| 6,136,396 A | 10/2000 | Gilmer |
| 6,173,858 B1 | 1/2001 | Norwood et al. |
| 6,383,425 B1 | 5/2002 | Wu et al. |
| 6,413,625 B2 | 7/2002 | Rolle et al. |
| 6,417,242 B1 | 7/2002 | Hughes et al. |
| 6,497,838 B2 | 12/2002 | Usui et al. |
| 6,521,675 B1 | 2/2003 | Wu et al. |
| 6,562,447 B2 | 5/2003 | Wu et al. |
| 6,600,143 B2 | 7/2003 | Hanada et al. |
| 6,719,943 B1 | 4/2004 | Neculescu et al. |
| 6,805,930 B2 | 10/2004 | Hanada et al. |
| 6,875,484 B1 | 4/2005 | Kogure et al. |
| 6,878,318 B2 | 4/2005 | Sakamoto et al. |
| 6,926,512 B2 | 8/2005 | Wu et al. |
| 7,086,580 B2 | 8/2006 | Liou |
| 7,585,557 B2 | 9/2009 | Aylward et al. |
| D626,829 S | 11/2010 | Touchet |
| 8,026,291 B2 | 9/2011 | Handa et al. |
| 8,114,492 B2 | 2/2012 | Palmer et al. |
| 8,393,886 B2 | 3/2013 | D'Amato |
| 8,715,449 B2 | 5/2014 | Leser et al. |
| 8,729,144 B2 | 5/2014 | Anker et al. |
| 8,883,280 B2 | 11/2014 | Leser et al. |
| 9,067,705 B2 | 6/2015 | Leser et al. |
| 9,102,461 B2 | 8/2015 | Leser et al. |
| 9,102,802 B2 | 8/2015 | Leser et al. |
| 2001/0001044 A1 | 5/2001 | Weder |
| 2001/0041236 A1 | 11/2001 | Usui et al. |
| 2003/0186039 A1 | 10/2003 | Hanada et al. |
| 2004/0213983 A1 | 10/2004 | Nodono et al. |
| 2005/0102897 A1 | 5/2005 | Vollers et al. |
| 2005/0107231 A1 | 5/2005 | Vollers et al. |
| 2005/0159496 A1 | 7/2005 | Bambara et al. |
| 2006/0148920 A1 | 7/2006 | Musgrave et al. |
| 2007/0184259 A1 | 8/2007 | Brunner et al. |
| 2008/0020162 A1 | 1/2008 | Fackler et al. |
| 2008/0029588 A1 | 2/2008 | Messerschmid et al. |
| 2008/0041860 A1 | 2/2008 | Wiedmeyer et al. |
| 2008/0128481 A1 | 6/2008 | Robertson |
| 2008/0156857 A1 | 7/2008 | Johnston |
| 2009/0184020 A1 | 7/2009 | Messerschmid et al. |
| 2010/0247830 A1 | 9/2010 | Hernandez |
| 2011/0104414 A1 | 5/2011 | Onodera et al. |
| 2011/0281704 A1 | 11/2011 | Messerschmid et al. |
| 2012/0006888 A1 | 1/2012 | D'Amato |
| 2012/0043374 A1 | 2/2012 | Lemon |
| 2012/0315448 A1* | 12/2012 | Navez .................... B29C 44/24 428/195.1 |
| 2012/0318805 A1 | 12/2012 | Leser et al. |
| 2012/0318806 A1 | 12/2012 | Leser et al. |
| 2012/0318807 A1 | 12/2012 | Leser et al. |
| 2012/0318812 A1 | 12/2012 | Leser et al. |
| 2012/0318859 A1 | 12/2012 | Leser et al. |
| 2013/0052385 A1 | 2/2013 | Leser et al. |
| 2013/0303645 A1 | 11/2013 | Dix et al. |
| 2014/0041785 A1 | 2/2014 | Chapman et al. |
| 2014/0120288 A1 | 5/2014 | Leser et al. |
| 2014/0131430 A1 | 5/2014 | Leser et al. |
| 2014/0166674 A1 | 6/2014 | Euler et al. |
| 2014/0167310 A1 | 6/2014 | Euler et al. |
| 2014/0167311 A1 | 6/2014 | Leser et al. |
| 2014/0167314 A1 | 6/2014 | Contrada et al. |
| 2014/0262916 A1 | 9/2014 | Minnelle et al. |
| 2014/0263602 A1 | 9/2014 | Leser et al. |
| 2014/0264139 A1 | 9/2014 | Sun et al. |
| 2014/0376835 A1* | 12/2014 | Rogers .................... B32B 5/18 383/207 |
| 2015/0001435 A1 | 1/2015 | Leser et al. |
| 2015/0014879 A1 | 1/2015 | Sun et al. |
| 2015/0051302 A1 | 2/2015 | Leser et al. |
| 2015/0054189 A1 | 2/2015 | Sun et al. |
| 2015/0250342 A1 | 9/2015 | Euler et al. |
| 2015/0258771 A1 | 9/2015 | Leser et al. |
| 2015/0274916 A1 | 10/2015 | Leser et al. |

(56) References Cited

U.S. PATENT DOCUMENTS

| | | | |
|---|---|---|---|
| 2015/0298889 A1 | 10/2015 | Leser et al. | |
| 2016/0001916 A1 | 1/2016 | Walker et al. | |
| 2016/0059514 A1 | 3/2016 | Perick | |
| 2016/0083570 A1 | 3/2016 | Sun et al. | |

FOREIGN PATENT DOCUMENTS

| | | | | |
|---|---|---|---|---|
| DE | 19536563 A1 | 4/1997 | | |
| DE | 19544858 A1 | 4/1997 | | |
| DE | 202010010411 U1 | 3/2011 | | |
| EP | 0071981 A1 | 2/1983 | | |
| EP | 0073416 A2 | 3/1983 | | |
| EP | 0086869 A1 | 8/1983 | | |
| EP | 0512179 A1 | 11/1991 | | |
| EP | 0570221 A2 | 11/1993 | | |
| EP | 0841150 A2 | 5/1998 | | |
| EP | 0960826 A2 | 12/1999 | | |
| EP | 1174346 A1 | 1/2002 | | |
| EP | 1479716 A1 * | 11/2004 | ............ | C08J 9/0061 |
| EP | 1939099 A1 | 7/2008 | | |
| EP | 2544953 B1 | 1/2015 | | |
| GB | 1005477 A | 9/1965 | | |
| GB | 1042775 A | 9/1966 | | |
| GB | 1333109 A | 10/1973 | | |
| JP | 05208442 A | 8/1993 | | |
| JP | 06906 A | 1/1994 | | |
| JP | 06908 A | 1/1994 | | |
| JP | 0686929 U | 12/1994 | | |
| JP | 9123291 A | 5/1997 | | |
| JP | 2004083117 A | 3/2004 | | |
| JP | 2004291626 A | 10/2004 | | |
| JP | 2005081796 A | 3/2005 | | |
| JP | 2006137044 A | 6/2006 | | |
| JP | 2006167984 A | 6/2006 | | |
| JP | 2006218817 A | 8/2006 | | |
| JP | 4300968 B2 | 7/2009 | | |
| JP | 4410398 B | 2/2010 | | |
| JP | 2010162761 A | 7/2010 | | |
| JP | 4547180 B2 | 9/2010 | | |
| WO | 8606045 A1 | 10/1986 | | |
| WO | 9113993 A1 | 9/1991 | | |
| WO | 9742025 A1 | 11/1997 | | |
| WO | 0073369 A1 | 12/2000 | | |
| WO | 0130570 A1 | 5/2001 | | |
| WO | 2007054179 A2 | 5/2007 | | |
| WO | 2011110355 A1 | 9/2011 | | |
| WO | 2012173873 A2 | 12/2012 | | |

OTHER PUBLICATIONS

Stange et al., "Effect of Long-chain Branching on the Foaming of Polypropylene with Azodicarbonamide", Oct. 24, 2006, Journal of Cellular Plastics, pp. 445-451 (Year: 2006).*
Machine translation of CN 102329405 (Year: 2012).*
International Search Report and Written Opinion for counterpart PCT/US2015/051492, dated Feb. 3, 2016.
International Search Report for PCT/US2012/041395, dated Sep. 17, 2013.
International Search Report for PCT/US2012/041397, dated Jul. 30, 2012.
European Search Report for Counterpart EP17164222.6, dated Jul. 3, 2017.
European Search Report for Counterpart EP17164223.4, dated Jul. 3, 2017.

* cited by examiner

INSULATED CONTAINER AND METHODS OF MAKING AND ASSEMBLING

CROSS-REFERENCE TO RELATED APPLICATIONS

This application claims the benefit of U.S. Provisional Application No. 62/054,142, filed Sep. 23, 2014, and U.S. Provisional Application No. 62/189,527, filed Jul. 7, 2015, both of which are herein incorporated by reference in their entirety.

BACKGROUND

Insulated containers, such as cups, can be used to store hot or cold beverages or food while providing a consumer holding the container with some protection from the temperature of the items stored in the container. Containers made from expanded foam materials are beneficial due to their thermal insulating properties and light weight. A common expanded material used in making containers is expanded polystyrene. However, expanded polystyrene can be challenging to recycle, dissuading some consumers from purchasing products made from expanded polystyrene. In the United States, an increasing number of municipalities are banning the use of expanded polystyrene containers due to poor public perception.

BRIEF SUMMARY

According to an embodiment of the invention, a multi-layer sheet for forming an expanded foam container, the multi-layer sheet comprising: a first layer of an expanded foam material comprising a first high melt strength homopolymer or copolymer of polypropylene; and a second layer of an unexpanded material comprising a second high melt strength homopolymer or copolymer of polypropylene; wherein the second layer is co-extruded, extrusion coated, or laminated on a first side of the first layer.

According to another embodiment of the invention, an expanded foam container comprising: a peripheral wall having an interior surface defining an interior cavity, an upper end defining an upper opening to the interior cavity and a lower end, opposite the upper end, defining a lower opening to the interior cavity; and a bottom wall closing the lower opening, the bottom element comprising a floor having an upper surface defining a bottom of the interior cavity and a lower surface; wherein at least the sleeve comprises a multi-layer sheet having a first layer of an expanded foam material comprising a first high melt strength homopolymer or copolymer of polypropylene, and a second layer of an unexpanded material comprising a second high melt strength homopolymer or copolymer of polypropylene, wherein the second layer is co-extruded, extrusion coated, or laminated on a first side of the first layer.

DETAILED DESCRIPTION

Figure 1:
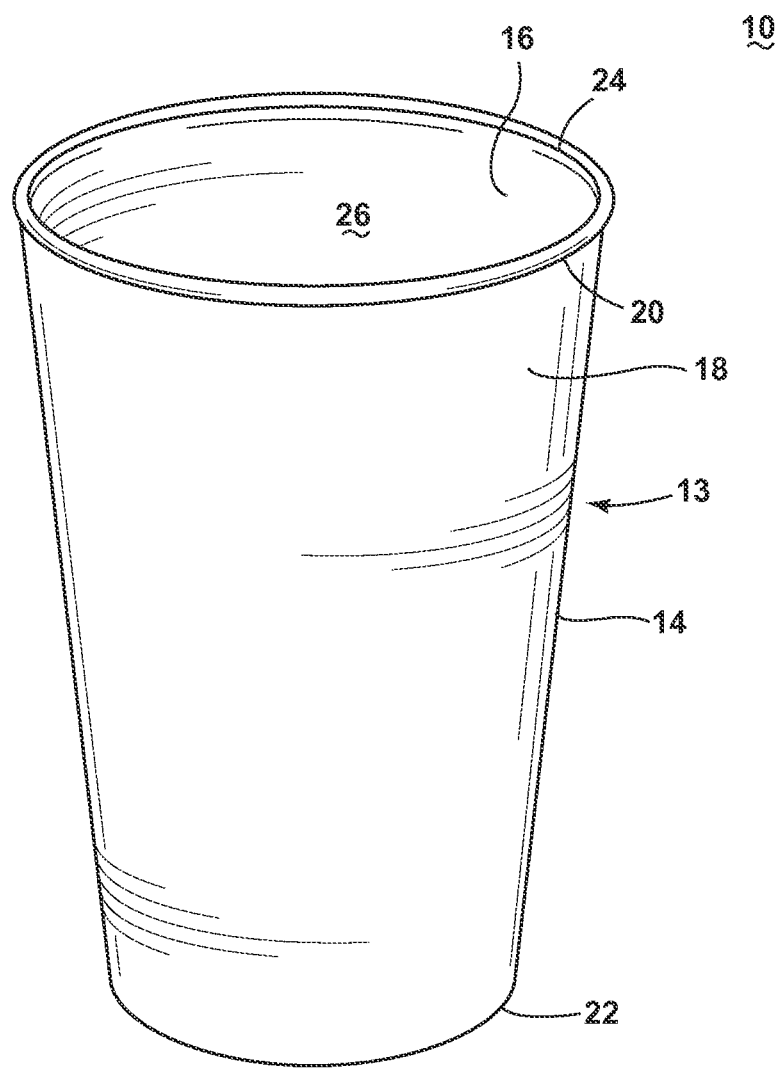
FIG. 1 is a perspective view of a container according to an embodiment of the invention.
Figure 2:
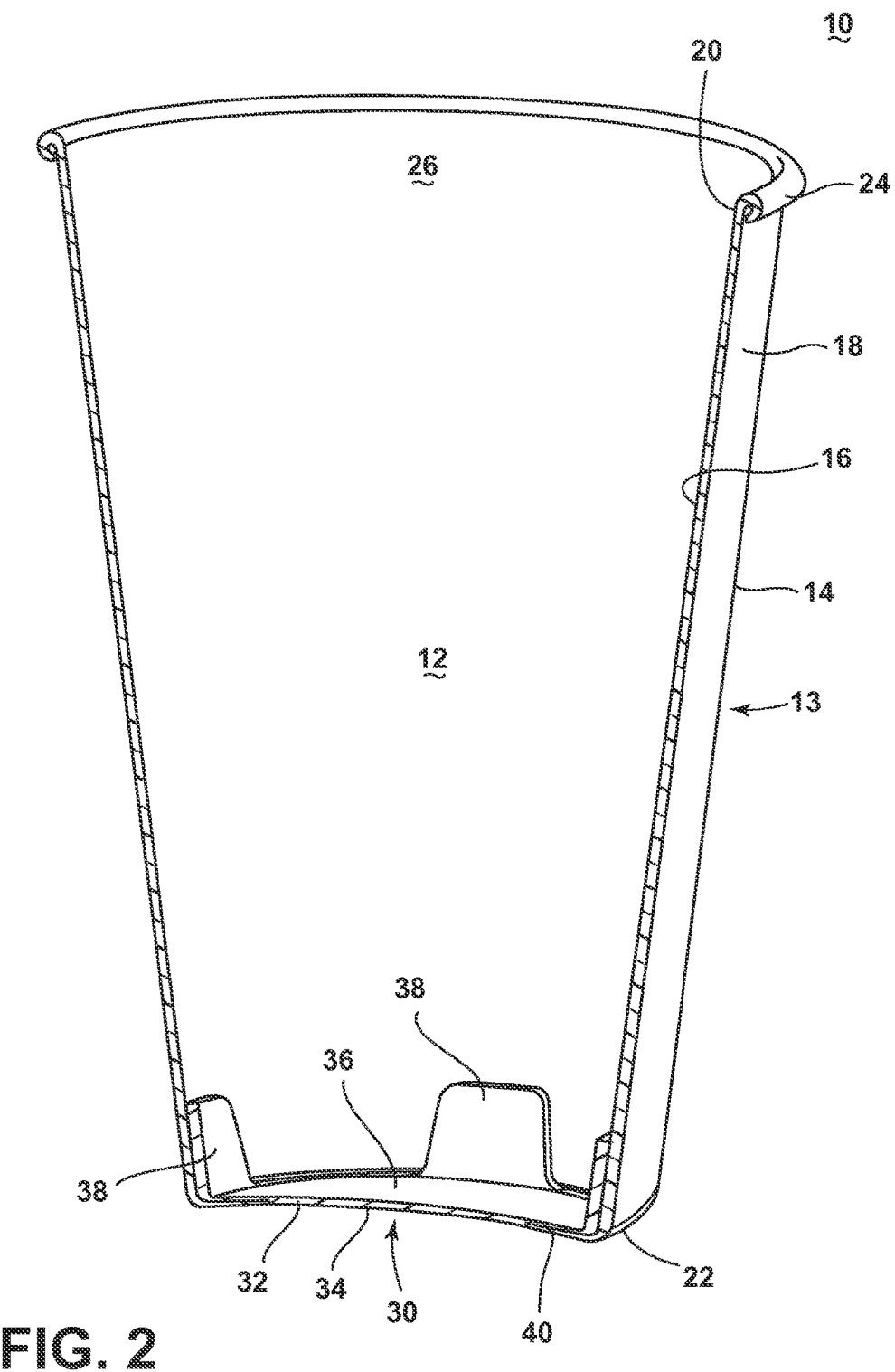
FIG. 2 is a cross-sectional view of the container of FIG. 1.

FIGS. 1 and 2 illustrate a container 10 defining an interior volume or cavity 12 for holding liquid or other items placed therein. In this embodiment, the container 10 is in the form of a cup having a sleeve 13 comprising a peripheral wall 14 that includes an interior surface 16, an exterior surface 18, an upper end 20 and a lower end 22. The upper end 20 may terminate in an upper rim or lip 24 that circumscribes an opening 26 of the container 10.

As can best be seen in FIG. 2, the container 10 includes a bottom element 30 for closing off a lower end of the container 10 opposite the opening 26. The bottom element 30 includes a floor 32 having a lower surface 34 facing away from the cavity 12 and an upper surface 36 facing the cavity 12, with the floor 32 providing the bottom element 30 with a slightly upwardly bowed cross-section (shown) or a generally flat cross-section. The bottom element 30 also includes at least one stacking element 38 within the cavity 12 and extending vertically towards the upper end 20. The stacking element 38 may include a plurality of spaced tabs, as illustrated, which may be regularly or irregularly spaced around the periphery of the bottom element 30. Alternatively, the stacking element 38 may comprise a non-continuous ring extending around the periphery of the bottom element 30.

Still referring to FIG. 2, the sleeve 13 includes a flange 40 extending from the lower end 22 of the peripheral wall 14 which extends inward towards the bottom element 30 and may be attached to the lower surface 34 of the bottom element 30. The flange 40 may be attached to the lower surface 34 in any suitable manner, non-limiting examples of which include a heat seal and/or an adhesive.

Figure 3A:
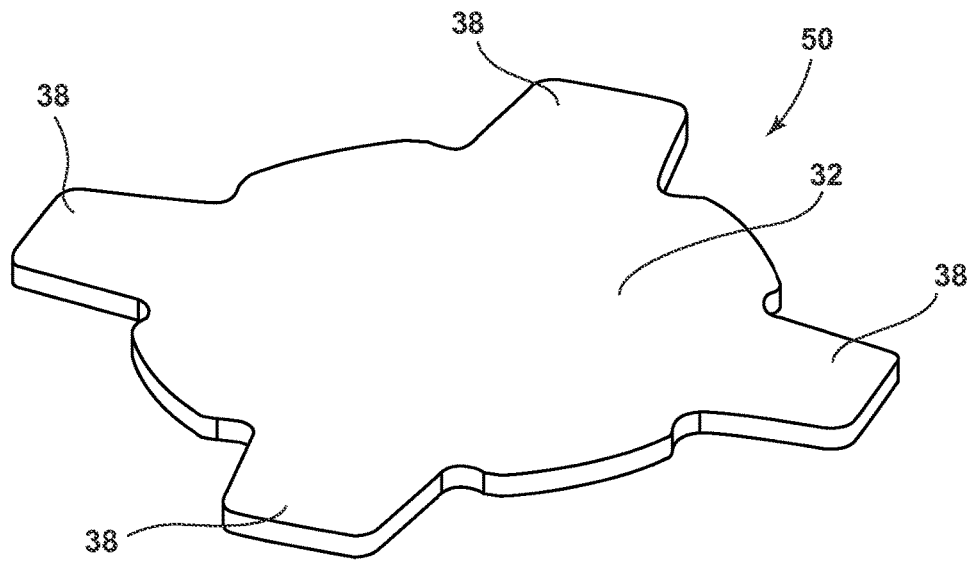
FIGS. 3A and 3B are a perspective view of a container bottom element in a pre-formed and formed state, respectively, according to an embodiment of the invention.
Figure 3B:
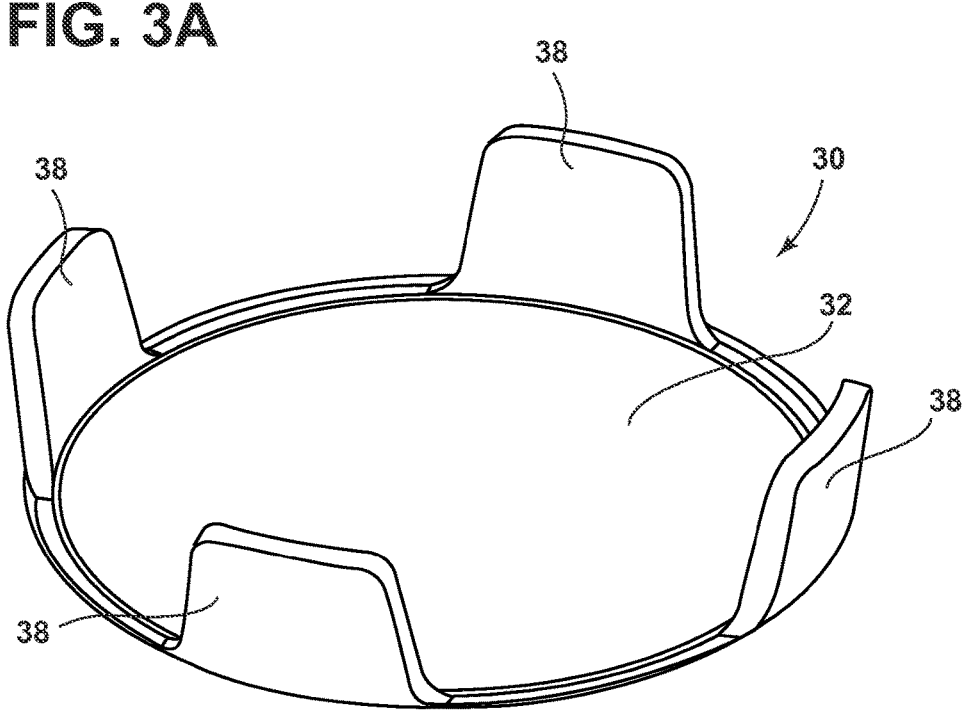

FIGS. 3A and 3B illustrate the bottom element 30 in a pre-formed and formed state, respectively. As illustrated in FIG. 3A, the bottom element 30 is made from a bottom element blank 50 which is cut from a sheet of expanded foam polymeric material. The bottom element blank 50 includes the floor 32 with the stacking elements 38 extending radially outward from the floor 32 in an unfolded, pre-formed condition. As illustrated in FIG. 3B, the stacking elements 38 can be folded vertically to form the bottom element 30.

Figure 4A:
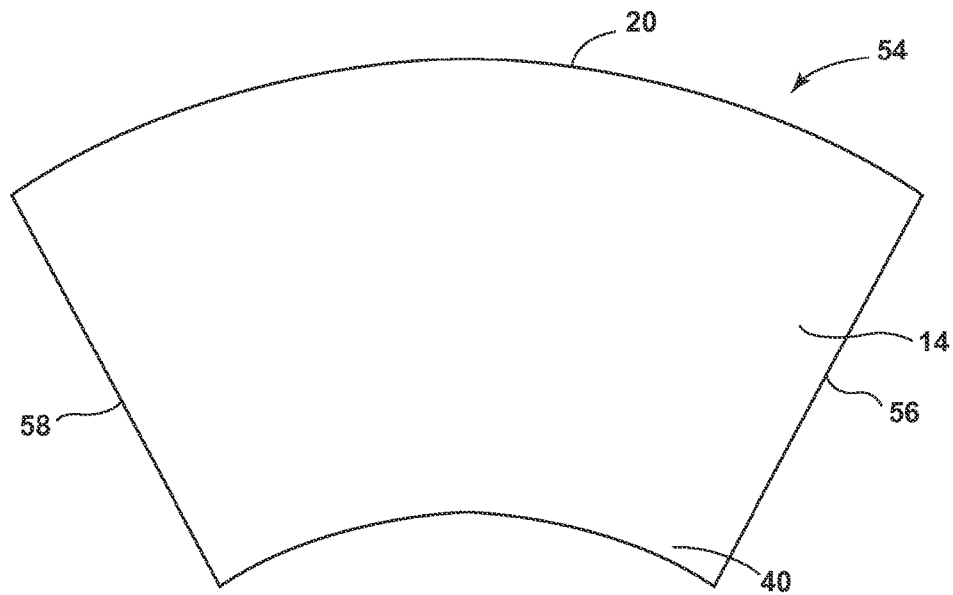
FIGS. 4A and 4B are a perspective view of a container sleeve in a pre-formed and formed state, respectively, according to an embodiment of the invention.
Figure 4B:
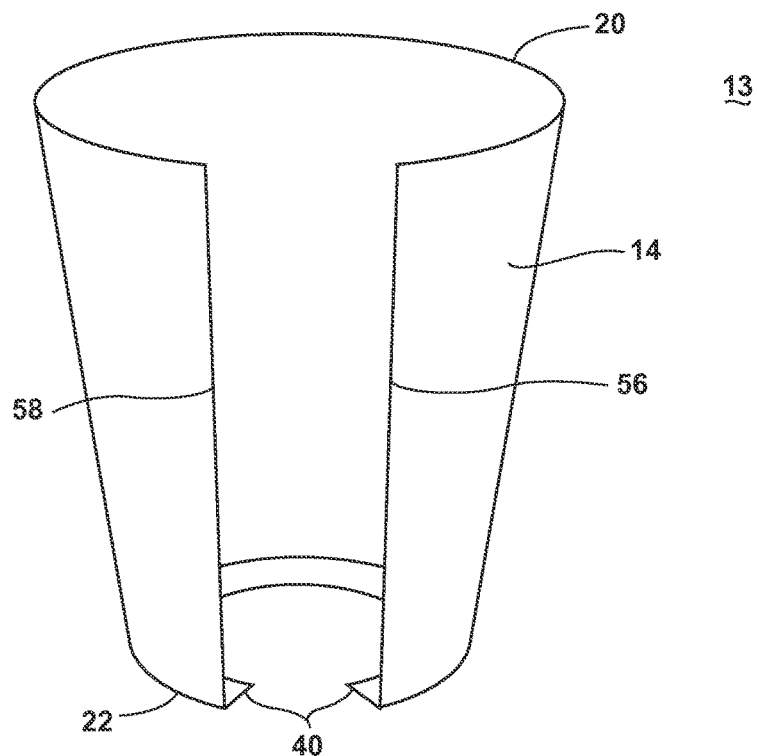

FIGS. 4A and 4B illustrate the sleeve 13 in a pre-formed and formed state, respectively. As illustrated in FIG. 4A, the sleeve 13 is made from a sleeve blank 54 which is made from a strip cut from a sheet of expanded polymeric material. The sleeve blank 54 can have a curved profile and include a portion corresponding to the peripheral wall 14 and a portion corresponding to the flange 40. As illustrated in FIG. 4B, the sleeve blank 54 can be wrapped to abut or overlap side edges 56 and 58 of the sleeve blank 54 and the flange 40 can be folded inward to form the sleeve 13.

Figure 5:
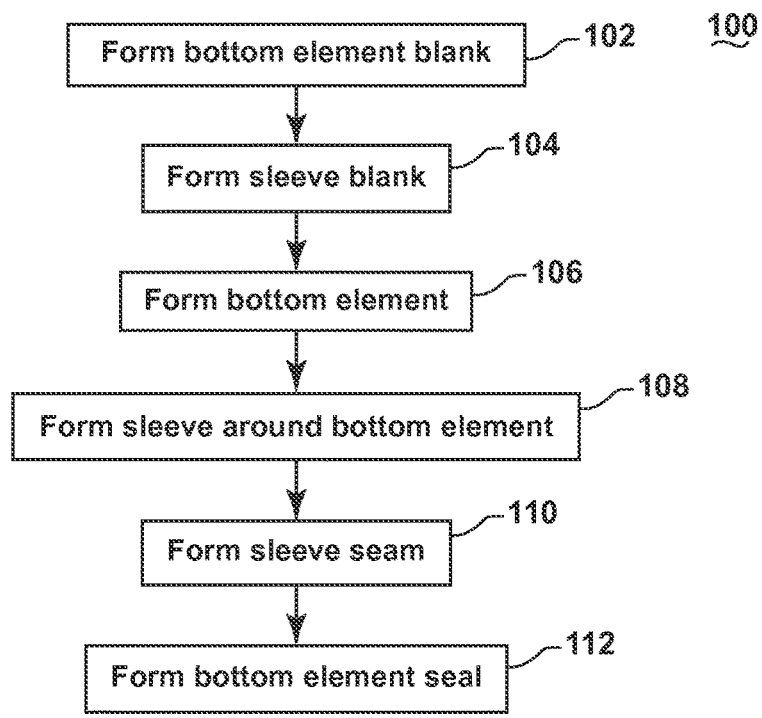
FIG. 5 is a flow chart illustrating a process for forming a container according to an embodiment of the invention.

FIG. 5 illustrates a thermoforming process 100 for forming the container 10. The sequence of steps depicted for this process is for illustrative purposes only, and is not meant to limit the method in any way as it is understood that the steps may proceed in a different logical order or additional or intervening steps may be included without detracting from the invention.

The process 100 may begin at 102 and 104 with forming the bottom element blank 50 and the sleeve blank 54, respectively. The bottom element blank 50 and peripheral wall blank 54 may be formed by cutting the blanks 50, 54 from a sheet of expanded or partially expanded polymeric material. Depending on the material used to form the blanks 50, 54, there may be some additional expansion of the material during the forming process when heat is involved. For example, for a polypropylene-based material, the sheet used to form the blanks 50, 54 may be fully or mostly expanded prior to cutting the blanks 50, 54. An additional, secondary expansion of the sheet forming the blanks 50, 54, such as 5-10% or less, may occur during steps of the container forming process which may include the application of heat to the material. The bottom element blank 50 and sleeve blank 54 are preferably from a polypropylene-based expanded polymeric material, however, it is also within the scope of the invention for the bottom element blank 50 and sleeve blank 54, and thus the container 10, to be made from any suitable expanded polymeric material, such as a polystyrene-based material, for example.

At 106, the bottom element blank 50 can be shaped to form the bottom element 30 by folding the stacking elements 38 (see FIG. 3B). The stacking elements 38 can be folded by placing the bottom element blank 50 on the end of a male mold and applying a vacuum to hold the bottom element blank 50 in place. The male mold can then be inserted into a corresponding bottom-forming female mold to fold the stacking elements 38 vertically about the side of the male mold. Heat can be applied before or during insertion of the bottom element blank 50 into the bottom-forming female mold to facilitate folding the stacking elements 38 against the sides of the male mold.

After the bottom element 30 is formed at 106, at 108 the sleeve blank 54 can be shaped around the bottom element 30 to form the sleeve 13. The bottom-forming female mold used at 106 can be removed and the sleeve blank 54 can be wrapped around the bottom element 30, which is held in place on the male mold by vacuum, until the side edges 56, 58 overlap or abut (see FIG. 4B). The sleeve blank 54 can be wrapped around the male mold such that at least a portion of the sleeve blank 54 is wrapped around the folded stacking elements 38 with a portion of the sleeve blank 54 corresponding to the flange 40 extending past the bottom element 30.

At 110, the side edges 56, 58 can be sealed to form a liquid-tight peripheral wall seam. The side edges 56, 58 can be sealed using heat and/or pressure by inserting the male mold with the sleeve blank 54 into a female mold and applying heat and/or pressure. Alternatively, heat and/or pressure can be applied to just the side edges 56, 58 to form the side wall seam using a seam clamp to provide localized pressure to the side edges 56, 58.

Before, after or concurrently with the formation of the peripheral wall seam at 110, the flange 40 can be folded under the bottom element 30 and sealed to the lower surface 34 of the bottom element 30 to form a liquid-tight bottom seal using heat and/or pressure at 112. In one example, heat can be applied to the flange 40 to facilitate folding of the flange 40 and then a bottom-forming mold can be used to compress the flange 40 against the floor 32 to form a liquid-tight bottom seal.

Figure 6:
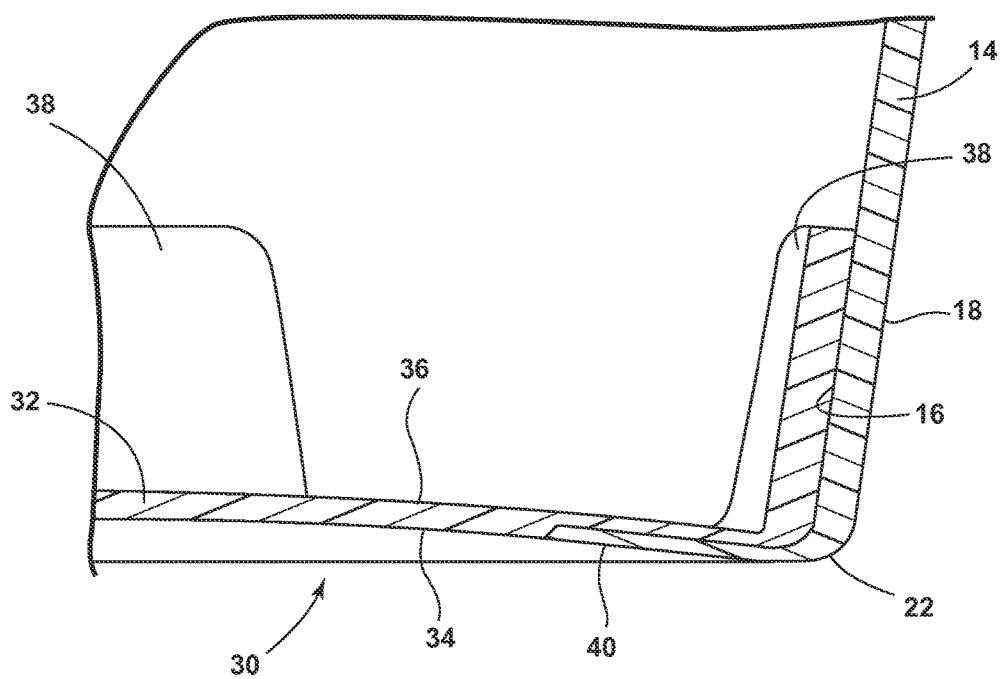
FIG. 6 is a cross-sectional view of a portion of the container of FIG. 1.

As illustrated in FIG. 6, the bottom-forming mold can press the flange 40 and the floor 32 against a bottom wall of the male mold until a thickness of a portion of the floor 32 which overlaps with the flange 40 is about the same as a thickness of a portion of the floor 32 which does not overlap with the flange 40. In this manner, the flange 40 and the bottom element 30 can be compressed during the formation of the liquid-tight seal such that there is a generally smooth transition between an exterior surface of the flange 40 and the lower surface 34 of the bottom element 30.

In addition to forming a bottom seal between the floor 32 and the flange 40, a liquid-tight heat seal can also be formed between the stacking elements 38 and the interior surface 16 of the peripheral wall 14 adjacent the stacking elements 38. The interior surface 16 of the peripheral wall 14 and/or an exterior surface of the stacking elements 38 can be provided with a coating, such as polyethylene, for example, which can be heated to form a heat seal between the interior surface 16 of the peripheral wall 14 and the stacking elements 38.

The thus formed container can then undergo additional processing, such as rolling of the upper edge 20 to form the lip 24.

Figure 7:
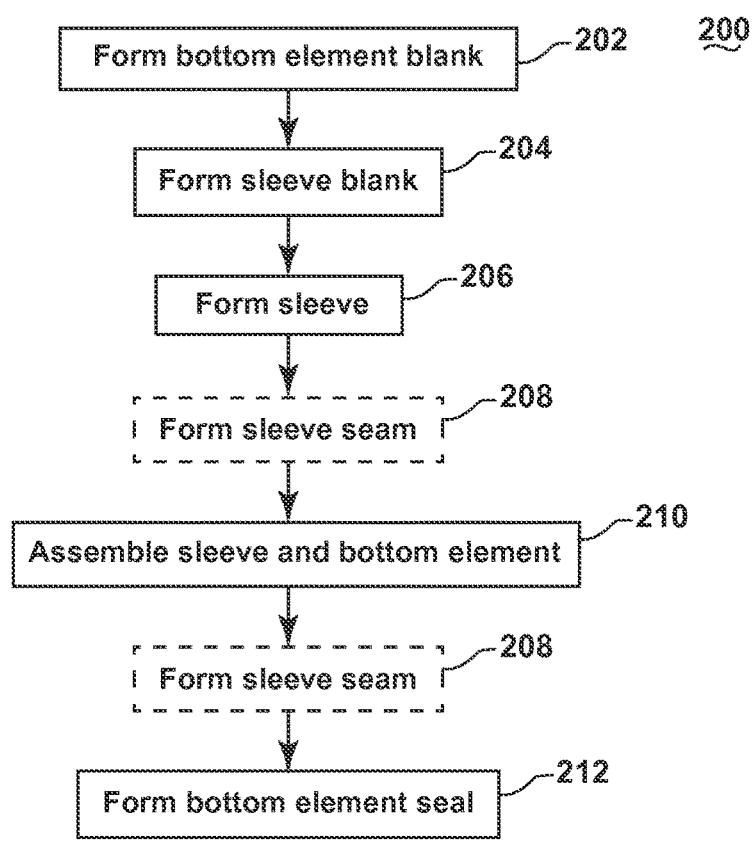
FIG. 7 is a flow chart illustrating a process for forming a container according to an embodiment of the invention.

FIG. 7 illustrates an alternative thermoforming process 200 that is similar to the process 100 of FIG. 5 except for the order of forming and assembling the bottom element 30 and sleeve 13. The bottom element blank 50 and sleeve blank 54 can be formed at 202 and 204, respectively, in the same manner as described above for the process 100.

At 206, the sleeve blank 54 can be wrapped until the side edges 56, 58 overlap or abut to form the sleeve 13 and the side edges 56, 58 can be sealed using heat and/or pressure to form a liquid-tight peripheral wall seam at 208. The sleeve blank 54 can be wrapped around a male mold and inserted into a female mold where heat and pressure between the male and female mold can be used to form the side wall seam, in a manner similar to that described above at 108 for the process 100. Alternatively, heat and/or pressure can be applied to just the side edges 56, 58 to form the side wall seam using a seam clamp to provide localized pressure to the side edges 56, 58. The liquid-tight peripheral wall seam can be formed prior to assembling the sleeve 13 and bottom element 30 at 208 or after the assembling of the sleeve 13 and the bottom element 30 at 210.

The sleeve 13 can be assembled with the bottom element 30 in its formed or pre-formed condition at 210. In one example, the bottom element blank 50 can be formed into the bottom element 30 by folding the stacking elements 38 using a male and female mold in a manner similar to that described above at 106 of the process 100. The thus formed bottom element 30 can then be inserted into the formed sleeve 13. Alternatively, the bottom element blank 50 can be inserted into the formed sleeve 13 and the process of inserting the bottom blank 50 into the formed sleeve 13 can fold the stacking elements 38 to form the bottom element 30 within the sleeve 13.

For example, the sleeve blank 54 or the formed sleeve 13 can be inserted into a female mold and the unformed bottom element blank 50 can be inserted into the sleeve 13 through the open upper end 20. As the bottom element blank 50 is inserted into the sleeve 13, interaction between the stacking elements 38 and the peripheral wall 14 folds the stacking elements 38 due to a difference in a diameter of the bottom element blank 50 and a diameter of portions of the sleeve 13, which tapers from the upper end 20 to the lower end 22. The bottom element blank 50 can be heated prior to insertion to facilitate folding of the stacking elements. A male mold can be inserted into the sleeve 13 adjacent the lower end 22 to act as a stop to limit insertion of the bottom element blank 50 within the sleeve 13.

At 212, the flange 40 can be folded under the bottom element 30 and sealed to the lower surface 34 of the bottom element 30 to form a liquid-tight bottom seal using heat and/or pressure in a manner similar to that described above at 110 for the process 100. If the sleeve 13 was formed using a female mold and not formed around a male mold, a male mold can be inserted into the sleeve and the female mold removed. A bottom-forming mold can be used to compress the flange 40 against the floor 32 to form a liquid-tight bottom seal. The bottom-forming mold can press the flange 40 and the floor 32 against a bottom wall of the male mold until a thickness of a portion of the floor 32 which overlaps with the flange 40 is about the same as a thickness of a portion of the floor 32 which does not overlap with the flange 40.

The thus formed container can then undergo additional processing, such as rolling of the upper edge 20 to form the lip 24. As described above for the process 100, in addition to forming a bottom seal between the floor 32 and the flange 40, a liquid-tight heat seal can also be formed between the stacking elements 38 and the interior surface 16 of the peripheral wall 14 adjacent the stacking elements 38.

Figure 8:
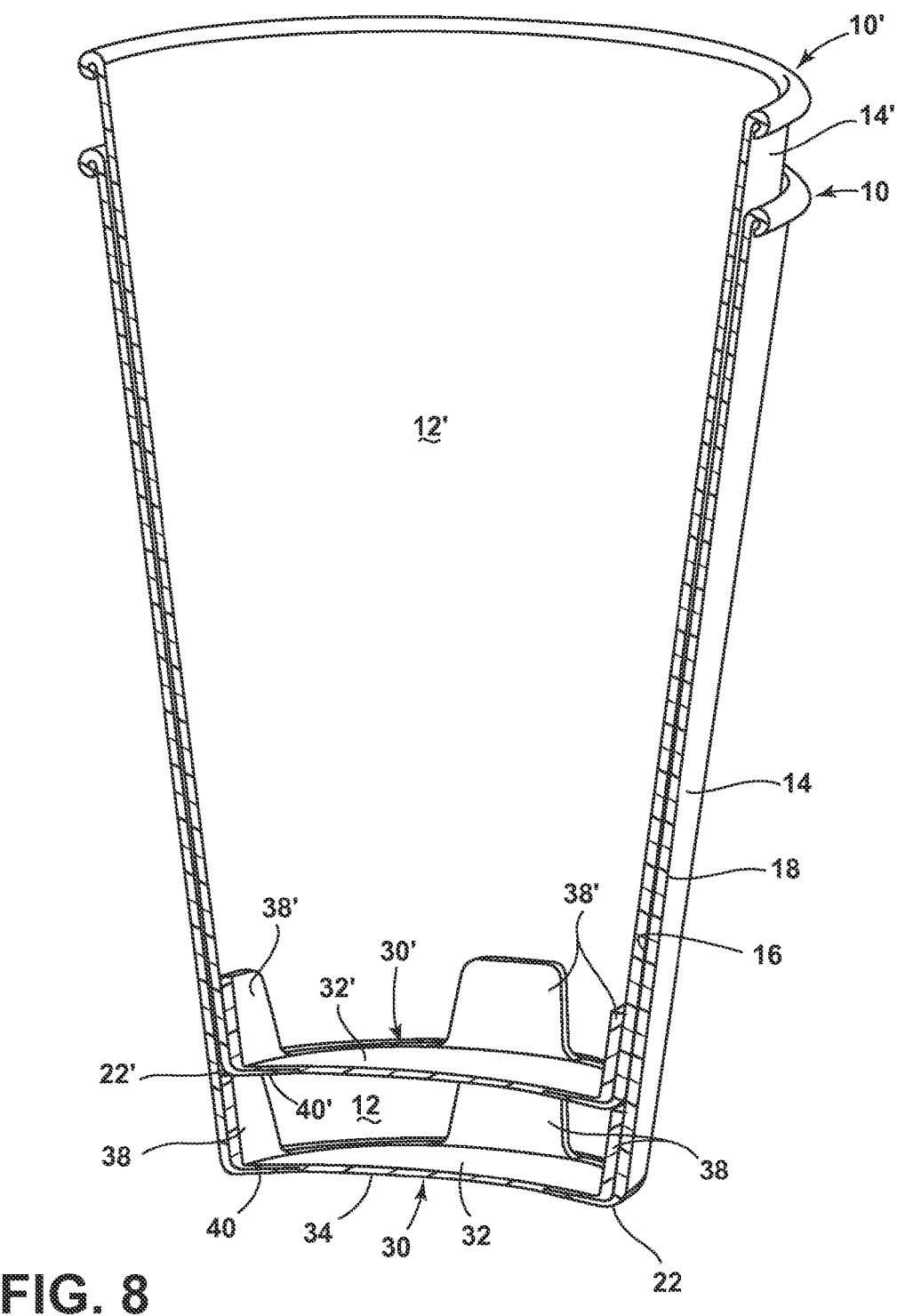
FIG. 8 is a cross-sectional view of a pair of nested containers according to an embodiment of the invention.

As illustrated in FIG. 8, the stacking elements 38 are configured to abut the lower end 22' of a similar container 10' that is inserted into the cavity 12 of the container 10 to limit the insertion of the container 10' into the cavity 12. The number and dimensions of the stacking elements 38 can be configured to support the similar container 10' that is inserted into the container 10 to facilitate nesting and de-nesting the stacked containers 10 and 10'. The stacking elements 38 limit the insertion of one container 10 into another container 10 to facilitate removal or de-nesting of a container 10 from a stack of similar nested containers 10.

The sleeve 13 and the bottom element 30 can be made from the same or different material and preferably are made from an expanded polymeric material, such as an expanded polypropylene. The expanded polymeric material can include one or more polypropylene materials as a base material. In an exemplary embodiment, the expanded polymeric material comprises a high melt strength polypropylene-based resin, at least one nucleating agent, and a blowing agent. The expanded polymeric material can be a single layer of material or part of a multi-layered material comprising at least two layers of material in which the expanded polymeric material forms the core layer and one or more additional skin layers are provided on one or both sides of the expanded polymeric material.

The material used to form the container 10 can be printed on prior to forming the container 10 or after the container 10 is formed. In one example, the expanded polymeric material used to form the sheets for the sleeve blank 52 and/or the bottom element blank 50 can be printed on prior to cutting the blanks 50, 52. The sheets can be fed into a flexographic printer where each color station of the flexographic printer can print a specific color onto the sheet according to the print design. If ultraviolet (UV) flexographic ink is used, the ink can be cured between each color station using a UV light source. If the ink is water-based, all of the colors can be printed onto the sheet and forced air can be used to dry the ink. The thus printed sheet can then be used immediately to for the bottom element and sleeve blanks 50, 52 or wound onto a roll for storage.

Alternatively, after the container 10 is formed, the container 10 can be fed into a conical container printer using a feed screw system that places the container 10 on print mandrels. Each print mandrel is indexed to a pretreat system for surface treatment of the side wall 14 and then indexed into the print position. At the print position, the side wall 14 can be printed on using a dry offset printing process with UV paste ink, for example. After printing, the container 10 is indexed into a curing position where the print mandrels are rotated in front of a UV light source to cure the ink. Once cured, the mandrels are indexed to an out-feed position and the containers 10 can be nested into stacks for storage.

Figure 9A:
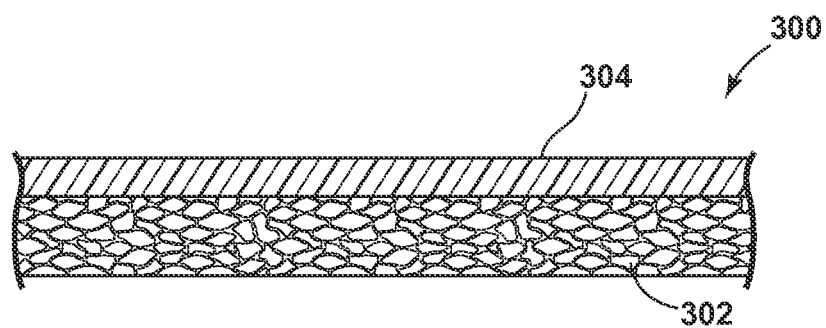
FIGS. 9A and 9B illustrate a multi-layer material for use in forming a container according to an embodiment of the invention.
Figure 9B:
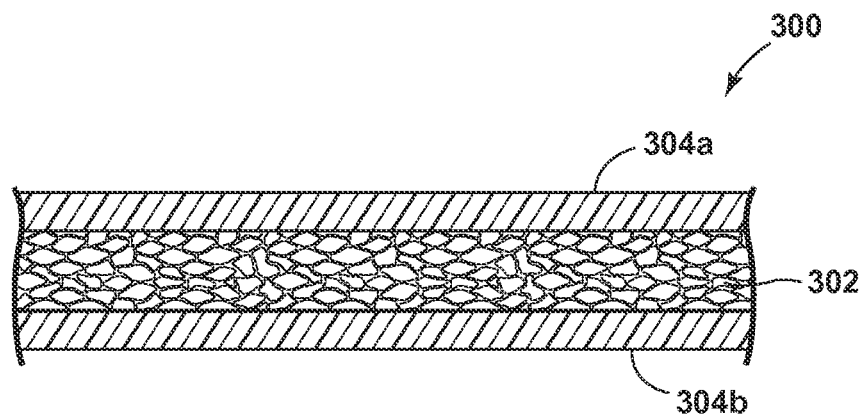

Referring now to FIGS. 9A and 9B, the material used to form a body blank for a container, such as the bottom element blank 50 and the sleeve blank 52, can be a multi-layer material 300 that includes an expanded polymeric layer as a core layer 302 and at least one unexpanded polymeric layer that forms a skin layer 304, which may be laminated, extrusion coated, or co-extruded with the core layer 302. It is also within the scope of the invention for the bottom element blank 50 to be made from a single, core layer 302, while the sleeve blank 52 is made from the multi-layer material 300. The multi-layer material 300 can include a single skin layer 304 on one side of the core layer 302, as illustrated in FIG. 9A, or alternatively, as illustrated in FIG. 9B, the multi-layer material 300 can include the core layer 302 and first and second unexpanded polymeric skin layers 304a and 304b, laminated, extrusion coated, or co-extruded on both sides of the expanded core layer 302.

The terms laminated, extrusion coated, and co-extruded are used herein in accordance with the normal meaning ascribed to such terms in the art of polymeric expanded materials. Extrusion coating as used herein refers to a process in which a first layer is extruded from a die onto a second, already extruded, and optionally already expanded, layer and pulled into a nip between a pressure roll and a chill roll with the pressure between the pressure roll and the chill roll forcing the first layer onto the second layer. Lamination refers to a process by which a first and second layer are formed separately and then adhered together using heat, pressure, and/or adhesives. Co-extrusion refers to a process by which a first extrudate and a second extrudate are coupled with a single die head and the first and second extrudates are extruded together through the die to form a multi-layer material.

The polypropylene-based resin used for the base material for the expanded core layer 302 may be a high melt strength homopolymer or copolymer that is not cross-linked and does not include long chain branching. A polypropylene homopolymer is typically characterized by a high isotactic index, resulting in a high melting point. Copolymers of polypropylene can include copolymers in which the polymer is derived from polypropylene monomers and at least one other species of monomer or a block copolymer derived from blocks of polypropylene monomers and blocks derived from at least one other species of monomer, non-limiting examples of which include ethylene, propylene, or a combination of ethylene and propylene. In an exemplary embodiment, the base material is an ethylene-propylene block copolymer.

Suitable high melt strength polypropylenes have a strain hardening behavior based on the elongational viscosity that imparts cell nucleating and growth properties that lead to fine, closed cells and a low density expanded material. Suitable high melt strength polypropylenes will also have high crystallinity and a high flexural modulus. An illustrative example of a high melt strength polypropylene has a melting point in the range of about 155-170° C., preferably 160-165° C., and a flexural modulus of at least 1400 MPa, preferably at least 1600 MPa, more preferably at least 1700 MPa. The melt flow rate (MFR) at 230° C. and 2.16 kg load is in the range of 0.1-18 g/10 min., preferably 1-13 g/10 min. Additionally, or alternatively, the high melt strength polypropylene has a die swell ratio (the ratio of extrudate diameter versus die diameter) of at least 1.55 as measured during extrusion from a 1 mm diameter orifice at an extrusion speed of 0.1 g/min. at 190° C. In another example, the high melt strength polypropylene has a melt tension of at least 0.5 grams, preferably 1.5 grams or greater, as characterized by capillary rheometer (measurements conducted at 230° C., strand length 40 mm, strand diameter 2 mm, piston speed 20 mm/min., drawing speed 4 m/min.).

Additional suitable high melt strength polypropylenes are ethylene-propylene block copolymers having high isotacicity, a broad molecular weight distribution and a high molecular weight. An exemplary high melt strength polypropylene has a weight average molecular weight (Mw) or number average molecular weight (Mn) of at least 300,000 g/mol and a polydispersity index (PDI) of at least 5.6. In another exemplary embodiment, the high melt strength polypropylene has a weight average molecular weight (Mw) or number average molecular weight (Mn) of at least 400,000 g/mol and a polydispersity index (PDI) of at least 8.4. The ethylene-propylene block copolymer may include an isotactic polypropylene segment with a crystalline polyethylene segment. In a further embodiment, the ethylene-propylene block copolymer has high elongation or tensile strain that is 70% or greater, preferably about 70-80%, at room temperature. The tensile strain can be measured according to ISO method 527 or ASTM method D638. As used herein, "ISO" refers to International Organization for Standardization and "ASTM" refers to ASTM International, formerly American Society for Testing and Materials; the year of the method is either designated by a suffix in the method number following a hyphen or colon, or, in the absence of such a designation, is the most current year prior to the filing date of this application.

An exemplary high melt strength homopolymer or copolymer that is not cross-linked and does not include long chain branching has a melting point in the range of about 155-170° C., more preferably 160-165° C., a flexural modulus of at least 1400 MPa, preferably at least 1600 MPa, more preferably at least 1700 MPa, a melt flow rate within the range of 0.1-18 g/10 min., preferably 1-13 g/10 min., at 230° C. and 2.16 kg load, a weight average molecular weight (Mw) or number average molecular weight (Mn) of at least 300,000 g/mol, a polydispersity index (PDI) of at least 5.6, and combinations thereof. Preferably, the exemplary high melt strength homopolymer or copolymer is an ethylene-propylene block copolymer. In another preferred embodiment, the exemplary high melt strength homopolymer or copolymer is an ethylene-propylene block copolymer having a high elongation or tensile strain that is 70% or greater, preferably about 70-80%, at room temperature.

An exemplary high melt strength polypropylene, which is not cross-linked and does not include long chain branching, is BC3BRF, available from Japan Polypropylene Corp., which is a linear ethylene-propylene block copolymer containing 8% ethylene that does not include long or short chain branching. Additional examples include an extrusion grade ethylene-propylene block copolymer having a higher melt strength than BC3BRF, such as FT3000 and FT6000, also available from Japan Polypropylene Corp.

The base material can be a single polypropylene-based resin having the above identified properties or a blend of two or more polypropylene-based resins. When the base material comprises a blend of polypropylene-based resins, all of the resins in the blend can have the above identified properties. Alternatively, at least one of the polypropylene-based resins used in the blend will be a high melt strength homopolymer or copolymer that is not cross-linked and does not include long chain branching having the above identified properties while one or more of the other polypropylene-based resins in the blend may have different properties.

In one example, the base material can include a blend of a first resin that is a high melt strength homopolymer or copolymer that is not cross-linked and does not include long chain branching having the above identified properties, such as BC3BRF, with a second resin having a high melt strength and long-chain branching and/or cross-linking Non-limiting examples of such a second resin include DAPLOY™ WB140, available from Borealis A/S, Denmark, or Pro-fax PF814 or X11844-30, available from Lyondell-Basell Montell, U.S.A. In yet another example, the base material can include a blend of a first resin that is a high melt strength homopolymer or copolymer that is not cross-linked and does not include long chain branching having the above identified properties, such as BC3BRF, with a second resin that is the same as the first resin, but which has been previously used and re-processed for additional use.

In another embodiment, the polypropylene-based resin used for the base material for the expanded core layer 302 may be a high melt strength polypropylene homopolymer which includes long chain branching. The long chain branched polypropylene can be characterized by a melt strength of at least 20 cN, and preferably in the range of 25-30 cN or greater (as determined according to ISO method 16790:2005). Illustrative examples of suitable long chain branched high melt strength polypropylenes have a melting point in the range of about 155-175° C. and a flexural modulus of at least 1400 MPa, preferably 1600 MPa or greater. The melt flow rate at 230° C. and 2.16 kg load is preferably in the range of 0.1-6 g/10 min., more preferably 1-3 g/10 min. The long chain branched polypropylene can be characterized by a melt tension of at least 3-15 g, preferably 5-12 g, as characterized by capillary rheometer (measurements conducted at 230° C., strand length 40 mm, strand diameter 2 mm, piston speed 20 mm/min., drawing speed 4 m/min.). The long chain branched polypropylene can also be characterized by a PDI of at least 8.

DAPLOY™ WB140, available from Borealis A/S, is an example of an exemplary long chain branched polypropylene suitable for use according to the embodiments of the invention. DAPLOY™ WB140 is characterized by the manufacturer as having a melting point in the range of 163-164° C., a crystallization temperature in the range of 127-128° C., a flexural modulus of 1900 MPa, a melt strength of 32-40 cN (as determined according to ISO method 16790:2005), an MFR of around 1.9-2.3 g/10 min., and a PDI of around 9. Additional long chain branched polypropylenes having one or more similar characteristics can also be used. In another example, long chain branched polypropylenes having a melt strength in the range of 20-25 cN can be used, such as X5259, which has a melt tension of 3 g at 230° C., or X5261, which has a melt tension of 13 g at 230° C., both available from Japan Polypropylene Corp.

In another embodiment, the polypropylene-based resin of the expanded core layer 302 may be a blend of the long chain branched high melt strength polypropylene and a second polypropylene. In one example, the second polypropylene is a high melt strength polypropylene block co-polymer, such as described above, that does not include long chain branching and is not cross-linked. An exemplary high melt strength polypropylene block co-polymer is BC3BRF, available from Japan Polypropylene Corp., or BC3BRF-MT, also available from Japan Polypropylene Corp., which has a higher melt strength than BC3BRF and is characterized by a melt tension of 0.9 g at 230° C. Additional examples of suitable high melt strength polypropylenes include STX0807, which has a melt tension of 1.5 g at 230° C., and STX0806, which has a melt tension of 1.3 g at 230° C., both of which are available from Japan Polypropylene Corp. The polypropylene block co-polymer can be present in the base resin at 20 to 25 wt. %.

In another embodiment, the second polypropylene can be a high melt strength polypropylene homopolymer that does not include long chain branching and is not cross-linked. The polypropylene homopolymer can have a melt strength of at least 15-18 cN and preferably in the range of 20-30 cN or greater, and a high molecular weight distribution, as characterized by a PDI greater than 8. An exemplary polypropylene homopolymer is further characterized by a melting point of 163-164° C., a crystallization temperature of 120-121° C., a melt flow rate in the range of 1-4 g/10 min. at 230° C. and 2.16 kg load, and a flexural modulus in the range of 2000-2200 MPa. The polypropylene homopolymer can be present in the base resin at 20 to 25 wt. %.

In another embodiment, the second polymer can be a thermoforming or blow molding grade polypropylene homopolymer, such as Inspire 6025 or Inspire 6021, available from Braskem, which have a melt flow rate in the range of 2-3.5 g/10 min. at 230° C. and 2.16 kg load, and a flexural modulus in the range of 1900-2000 MPa or greater to increase the strength of the expanded core layer 302.

In addition to the polypropylene-based base material, the expanded core layer 302 can also include at least one nucleating agent to provide nucleation sites to facilitate bubble formation in the molten resin during an extrusion process and control the size and morphology of cell formation in forming the expanded material. Non-limiting examples of suitable nucleating agents that may be included in the expanded polymeric material include organic sodium phosphates, sodium benzoate, carboxylic aromatic or aliphatic acids, silicates or alumino-silicates of an alkali or alkaline earth metal, mixtures of citric acid and sodium bicarbonate or other alkali metal bicarbonate, talc, silicon dioxide, diatomaceous earth, kaolin, polycarboxylic acids and their salts, and titanium dioxide. The type and amount of nucleating agent can be selected to provide the desired cell size and morphology. The amount of nucleating agent can be defined in terms of weight percent (wt. %) of the nucleating agent based on the total weight of the mixture of the base resin and any additional components that form the polymer melt. As used herein, wt. % refers to the amount by weight of a given material as a percentage of the total weight of the mixture of the base resin and any additional components that form the polymer melt. The amount of nucleating agent added to the base resin may correspond to an amount of a nucleating agent composition that includes one or more nucleating agents and optionally additional additives that may or may not facilitate cell formation. Alternatively, the amount of nucleating agent added to the base resin may correspond directly to an amount of the material that provides the properties of a nucleating agent regardless of whether additional materials are mixed with the nucleating agent.

The expanded polymeric material of the expanded core layer 302 can also include at least one blowing agent. A blowing agent introduces gas into the resin mixture to form an expanded structure within the resin and reduce the density of the extrudate. The blowing agent can be a physical or a chemical blowing agent. Chemical blowing agents can be organic or inorganic materials that release gas upon thermal decomposition. Physical blowing agents facilitate cell formation within the resin through the expansion of a compressed gas, evaporation of a liquid or the dissolving of a solid. Non-limiting examples of suitable blowing agents include nitrogen, carbon dioxide and other inert gases and agents that undergo phase change from liquid to gas during the expanding process, chlorofluorocarbons (CFC), hydrochlorofluorocarbons (HCFC), hydrofluorocarbons (HFC), low boiling alcohols, ketones, hydrocarbons such as propane, butane, cyclobutane, cyclopentane, pentane, n-butane, n-pentane, isopentane, and isobutene, azodicarbonamide, azodiisobutyro-nitrile, n-propanol, isopropanol, sodium bicarbonate, sodium carbonate, ammonium bicarbonate, ammonium carbonate, and ammonium nitrite. The type and amount of blowing agent can be selected to provide the desired expanded structure and density of the extrudate.

In an exemplary embodiment, the expanded polymeric material of the expanded core layer 302 can include a physical blowing agent and a passive nucleating agent. A passive nucleating agent is typically a solid material having a fine particle size, such as talc, for example. The nucleating agent can create sites where the physical blowing agent can come out of solution during foam expansion, providing a starting point from which the foam cells start to grow. Alternatively, an active nucleating agent can be used. An active nucleating agent is a material that can act as a chemical blowing agent by generating gas upon decomposition, and also act as a nucleating agent. An example of a suitable active nucleating agent is a mixture of sodium bicarbonate and citric acid.

The expanded polymeric material of the expanded core layer 302 can also include additional materials, non-limiting examples of which include processing aids, plasticizers, anti-static agents, and clarifiers.

In an exemplary embodiment, the expanded core layer 302 can include a high melt strength polypropylene having a melting point of about 155-170° C., a flexural modulus of at least 1400 MPa, and a melt flow rate in the range of 0.1-18 g/10 min. 230° C. and 2.16 kg load, such as BC3BRF, as the base resin, 0.07-0.25 wt. %, more preferably 0.1-0.2 wt. %, of a nucleating agent, and a physical blowing agent charged at about 1.2 lbs/hr. In a preferred embodiment, the expanded core layer 302 includes a high melt strength polypropylene having a melting point of about 160-165° C., a flexural modulus of 1720 MPa, and a melt flow rate of 12±2 g/10 min. 230° C. and 2.16 kg load, such as BC3BRF, as the base resin. An exemplary physical blowing agent is a hydrofluorocarbon, such as 1,1-difluoroethane, also known as HFC-152a, commercially available as Formacel® Z2 from DuPont™, U.S.A. An exemplary nucleating agent is commercially available as Hydrocerol® 1604 from Clariant™, U.S.A., which is described as a mixture of a chemical blowing agent, calcium oxide and silica.

Table 1 below illustrates exemplary compositions for forming the expanded core layer 302. In a preferred embodiment, the nucleating agent is Hydrocerol® 1604 from Clariant™, U.S.A. and the blowing agent is Formacel® Z2 from DuPont™, U.S.A., although additional or alternative nucleating agents and/or blowing agents can be used without deviating from the scope of the invention. In Examples 3-5 the second resin is present in an amount in the range of 20-30 wt. %. All of the examples included a 1-2 mil unexpanded skin layer made using BC3BRF and 3 wt. % of a white pigment, such as CH27043 2FA masterbatch, available from Ferro Corporation, U.S.A.

TABLE 1

Exemplary expanded core layer compositions.

| Example | Base resin | Second Resin | Nucleating Agent (wt. %) | Blowing Agent (lbs/hr) |
|---|---|---|---|---|
| 1 | PP block co-polymer (e.g. BC3BRF) | — | 0.07-0.25 | 1.2 |
| 2 | Long chain branched PP (e.g. DAPLOY™ WB140) | — | 0.15-0.25 | 1.2 |
| 3 | Long chain branched PP (e.g. DAPLOY™ WB140) | PP block co-polymer (e.g. BC3BRF) | 0.15-0.25 | 1.2 |
| 4 | Long chain branched PP (e.g. DAPLOY™ WB140) | PP homopolymer | 0.15-0.25 | 1.2 |
| 5 | Long chain branched PP (e.g. DAPLOY™ WB140) | Thermoforming or blow molding grade PP (e.g. Inspire 6025 or 6021) | 0.15-0.25 | 1.2 |

The unexpanded skin layer or layers 304 can include a base resin that is the same or different than the base resin used in the expanded core layer 302. For example, the unexpanded skin layer can include a high melt strength homopolymer or copolymer that is not cross-linked and does not include long chain branching, such as BC3BRF or FT3000, or other similar polypropylenes having a similar or higher melt flow rate.

The polypropylene material used in the unexpanded skin layer 304 preferably has an elongation or tensile strain high enough to stretch without breaking during the expanding of the core layer 302, but does not necessarily need to have the high melt strength or extensional viscosity that provides strain hardening properties that would typically be needed for expansion in a foaming process. Thus, thermoforming grades of polypropylene which have a high melt strength, such as a polypropylene homopolymer PP6262, available from ExxonMobil™, U.S.A., or FT021N or 6025N, both available from Braskem, U.S.A, are suitable for use in the unexpanded skin layer 304. Film or blowing molding grade polypropylenes, such as FB3B, available from Japan Polypropylene Corp. or any of several polypropylene homopolymers available from Borealis A/S, Denmark, non-limiting examples of which include HD601CF, HD905CF, HD915CF, and HC205TF, or polypropylene copolymers, such as RD204CF, RB206MD, RB707CF, which have a high melt strength and high tensile strain are also suitable for use in the unexpanded skin layer 304.

Additional desirable characteristics of the material used to form the unexpanded skin layer 304 include a material that can flow and extrude steadily at the expanding temperature of the expanded core layer 302. In an exemplary embodiment, the material used for the unexpanded skin layer 304 can be a high gloss random or block copolymer having a slightly lower melting point than the material used in the expanded core layer 302 to minimize crystallization of the unexpanded skin layer 304 at the expansion temperature of the expanded core layer 302 when the layers 302 and 304 are co-extruded. Crystallization of the unexpanded skin layer 304 can result in undesirable solidification and shrinkage of the unexpanded skin layer 304 too early in a co-extrusion process. In addition, when the expanded core layer 302 and unexpanded skin layer 304 are co-extruded, the unexpanded skin layer 304 is preferably selected to have a viscosity suitable for merging with the gas laden polymer melt of the expanded core layer 302 flowing through the extrusion die to minimize instability at the interface of the expanded core layer 302 and unexpanded skin layer 304 that could result in poor surface quality of the unexpanded skin layer 304. The materials of the unexpanded skin layer 304 can also be selected to provide a shrinkage rate compatible with that of the expanded core layer 302, which decreases creases and wrinkles in the co-extruded multi-layer sheets 300.

In an exemplary embodiment, the melt flow rate of the material used for the unexpanded skin layer 304 is higher than the melt flow rate of the material used for the expanded core layer 302. For example, the expanded core layer 302 can be made from a material having melt flow rate in the range of 0.1-14 g/10 min. at 230° C. and 2.16 kg load while the unexpanded skin layer 304 is made from a material having an melt flow rate in the range of 8-18 g/10 min. at 230° C. and 2.16 kg load.

Additional additives may be combined with the base resin to provide the unexpanded skin layer 304 with the desired characteristics. In an exemplary embodiment, the base resin may be combined with additives to provide the unexpanded skin layer 304 with the desired physical characteristics, such as opacity, color, gloss and brightness. The type and amount of additive can be selected to provide the desired opacity to minimize the visibility of blotches that may occur if a colored liquid inside the container 10, such as coffee, leaches through the expanded core layer 302. Increasing the opacity of the unexpanded skin layer 304 can also hide defects in the cell structure on the surface of the expanded core layer 302 which lie underneath the unexpanded skin layer 304.

An example of a suitable additive can include a mixture of inorganic materials, such as titanium oxide and calcium carbonate, and pigment, such as a white color concentrate commercially available from Ferro Corporation, U.S.A, available under the trade name CH27043 2FA masterbatch. CH27043 2FA masterbatch has typical melt flow rate greater than 10 g/10 min. 230° C. and 2.16 kg load, 60-65% ash content, a density of 1.49 g/cm$^3$, and a pigment content of approximately 63%. Additional non-limiting additives are commercially available from PolyOne™ under the trade names MB D77503 or CC10197045WE, for example. In a preferred embodiment, the unexpanded skin layer 304 can include a mixture of a high melt strength homopolymer or copolymer that is not cross-linked and does not include long chain branching, such as BC3BRF, and approximately 3-5 wt. % of a pigment and opacifying agent, such as CH27043 2FA masterbatch. The masterbatch can be provided at a concentration configured to provide the unexpanded skin layer 304 with the desired opacity, whiteness, brightness and gloss as well as reduces the viscosity of the base resin to provide the unexpanded skin layer 304 with rheological properties that are compatible with those of the of the expanded core layer 302 at the expansion temperature inside the die used in the co-extrusion process of the foamed core layer 302 and the unexpanded skin layer 304.

Additional examples of opacifying additives suitable for use with the base resin of the unexpanded skin layer 304 include zinc sulfide, barium sulfate, and antimony oxide.

Preferably, the expanded core layer 302 and the unexpanded skin layer 304 have comparable rheological properties (e.g. similar or equivalent viscosity) at the extrusion foaming temperature of the expanded core layer 302 inside the die. Compatible rheological properties can inhibit melt fracturing or instability at an interface of the expanded core layer 302 and the unexpanded skin layer 304, which can provide a smooth surface that has minimal indentations to facilitate printing high resolution graphics onto the skin layer 304. In addition, the polypropylene of the skin layer 304 can be selected based on its crystallization temperature according to a temperature gradient across the skin layer 304 and the expanded core layer 302 in the thickness direction to provide compatible shrinkage and crystallization rates between the skin layer 304 and the expanded core layer 302 to inhibit the formation of wrinkles and creases in the multi-layer material 300. The skin layer 302 can further be selected to have a high extension or elongation and a high stretching capability to inhibit corrugation during expansion of the core layer 302. BC3BRF, for example, embodies both of these characteristics, having a high tensile modulus of 1730 MPa (as determined according to ISO 527-1) with a 100% tensile yield strain (as determined according to ISO 527-1). The skin layer 304 can also provide lacing resistance and a barrier effect to inhibit gas leakage and permeation which can facilitate the nucleation of uniform, fine closed cells in the expanded core layer 302.

The multi-layer material 300 can be formed with properties suitable for use in forming the container 10 in a thermoforming process. The multi-layer material 300 used to form the bottom element blank 50 can be the same or different than that used to form the sleeve blank 52, depending on the desired characteristics of the sleeve 13 and the bottom element 30. The multi-layer material(s) 300 can be formed to provide the subsequently formed bottom element blank 50 and sleeve blank 52 with properties that facilitate subsequent container forming processes. For example, the multi-layer sheet 300 forming the sleeve blank 52 can be co-extruded to facilitate inward curling of the edges of the sleeve blank 52 upon the application of heat to facilitate wrapping the sleeve blank 52 to form the sleeve 13 and/or to facilitate folding the bottom edge of the sleeve blank 52 around the bottom element 30. In contrast, when the assembled bottom element 30 forms a slightly bowed (FIG. 2) or generally flat cross-section, it can be desirable to form the bottom element blank 50 from a material which does not curl when heat is applied.

One method for facilitating inward curling of the edges of the sleeve blank 52 is to extrude the multi-layer material 300 in a process which includes different cooling and shrinkage rates on the outer surfaces of the extrudate. The difference in temperature distribution between the two outer surfaces can provide a difference in the stress and strain characteristics of the two surfaces which can result in curling of the extrudate. For example, the co-extruded multi-layer material 300 can be extruded such that the outer surface of the unexpanded skin layer 304 is cooled by an air ring, while the outer surface of the expanded core layer 302 is cooled differently, such as by contact with a water chilled mandrel and/or cooling air.

In an exemplary embodiment, the multi-layer material 300 comprising the expanded core layer 302 and a single unexpanded skin layer 304 used to form the sleeve blank 52 can have a total thickness of about 55-68 mils (1.397-1.727 mm), a density of less than about 12.5 lb/ft$^3$, a base weight of less than 0.72 g/in$^2$ and a skin layer thickness of about 1-2 mils (0.0254-0.0508 mm). While this same material can also be used to form the bottom element blank 50, in a preferred embodiment, the material used to form the bottom element blank 50, which can be the multi-layer material 300 or a material comprising only the expanded core layer 302, can have a thickness in the range of 55-85 mil, more preferably 65-75 mils, and a density in the range of 9-12 lb/ft$^3$. The use of a single, expanded core layer 302 to form the bottom element 30 can reduce the weight of the bottom element 30 as well as facilitate the formation of the flat cross-section bottom.

Additionally, or alternatively, to facilitate the formation of a bottom element 30 having a slightly bowed or flat cross-section, the material used to form the bottom element blank 50, whether it is the multi-layer material 300 or the single, expanded core layer 302, can be formed such that there is minimal orientation of the cells during expansion in both the machine direction and the cross-machine direction, to minimize shrinkage of the bottom element blank 50 upon heating. The material used to form the bottom element blank 50 may further be expanded in a process which provides equal stress and strain on both sides of the material to facilitate forming a flat sheet and to minimize curling of the sheet upon heating.

The bottom element blank 50 can be formed from a single layer of expanded core layer 302 or from the multi-layer material 300 comprising an expanded core layer 302 and an unexpanded skin layer 304 on one or both sides of the expanded core layer 302. In one exemplary embodiment, the bottom element blank 50 can be formed from a single expanded core layer 302 made from an expanded high melt strength polypropylene having a thickness in the range of 52-72 mils and a density of 11.5-12.5 lb/ft$^3$. Alternatively, the bottom element blank 50 can be made from a multi-layer material 300 comprising an expanded core layer 302 and a single unexpanded core layer 304, the total thickness of the bottom element blank 50 in the range of 48-60 mils and having a density of 11.5-12.5 lb/ft$^3$.

The expanded core layer 302, whether used alone as a single layer or as part of a multi-layer material 300, preferably has a normalized cell size, as measured by microscopy according to ASTM method D3576-98 in the range of 300-500 micrometers, more preferably in the range of 300-450 micrometers. Cell size in the thickness dimension can be in the range of 150-200 micrometers while cell size in the machine direction and the transverse (cross direction) can be in the range of 500-980 micrometers and 350-500 micrometers, respectively. The preferred cell size aspect ratio in the machine direction relative to the transverse direction is about 2 or less. The closed cell content as measured by pycnometer according to ASTM method D6226-10 is at least 25%, preferably at least 35%, more preferably at least 50% and still more preferably at least 60%. The closed cell content can be selected based on the intended use of the container 10. For example, if the container 10 is in the form of a hot beverage cup, such as would be used for coffee or tea, the closed cell content is preferably at least within the range of 35-40% to minimize leaching of the hot beverage through the container.

The unexpanded skin layer 304 of the multi-layer material 300 which forms the exterior surface 18 of the container 10 can be provided with properties to facilitate printing graphics on the exterior surface 18. Preferably, the unexpanded skin layer 304 forming the exterior surface 18 has a smooth surface to facilitate printing on as well as a gloss level in the range of 35-40 gloss units or greater and/or an opacity of equal to or greater than about 65%. The gloss level was determined using a gloss meter at a 60 degree measurement angle. The gloss meter was used to take a gloss level measurement at multiple locations of the test sample and the highest reading was recorded. The measurement values for the gloss meter are related to the amount of reflected light from a calibration standard for defining a standard gloss unit according the instructions provided by the manufacturer of the gloss meter, as is known in the art.

The multi-layer material 300 comprising a polypropylene-based expanded core layer 302 and unexpanded skin layer 304 can be used to form containers having stiffness and thermal insulation characteristics comparable with a typical expanded polystyrene foam container. In addition, forming both the core and skin layers 302 and 304 of the multi-layer material 300 from a polypropylene-based base resin provides a material that can provide fewer recycling challenges than a polystyrene based material. High melt strength polypropylene-based materials which are not cross-linked and do not include long chain branching, such as FT3000 or BC3BRF from Japan Polypropylene Corp., can be re-used or re-ground for repeated extrusion and expansion to provide an expanded material having properties similar to the original material without additional recycling additives (e.g. anti-oxidation additives and/or thermal stabilizers). The use of a high melt strength polypropylene-based material which is not cross-linked and does not include long chain branching negates the need to add recycling additives for the purposes of preventing scission or damage of long chain branches or cross-linking during re-grinding and pelletizing. FT3000, for example, can be re-used multiple times to form an expanded material without recycling additives to prevent scission or damage of long chain branches or cross-linking. When the multi-layer material 300 includes polypropylenes which are cross-linked and/or include long chain branching, recycling additives (e.g. anti-oxidation additives, such as IRGAFOS® 168, available from BASF, and/or thermal stabilizers) can be used to prevent scission or damage of the long chain branches or cross-linking during re-grinding and pelletizing.

Figure 10:
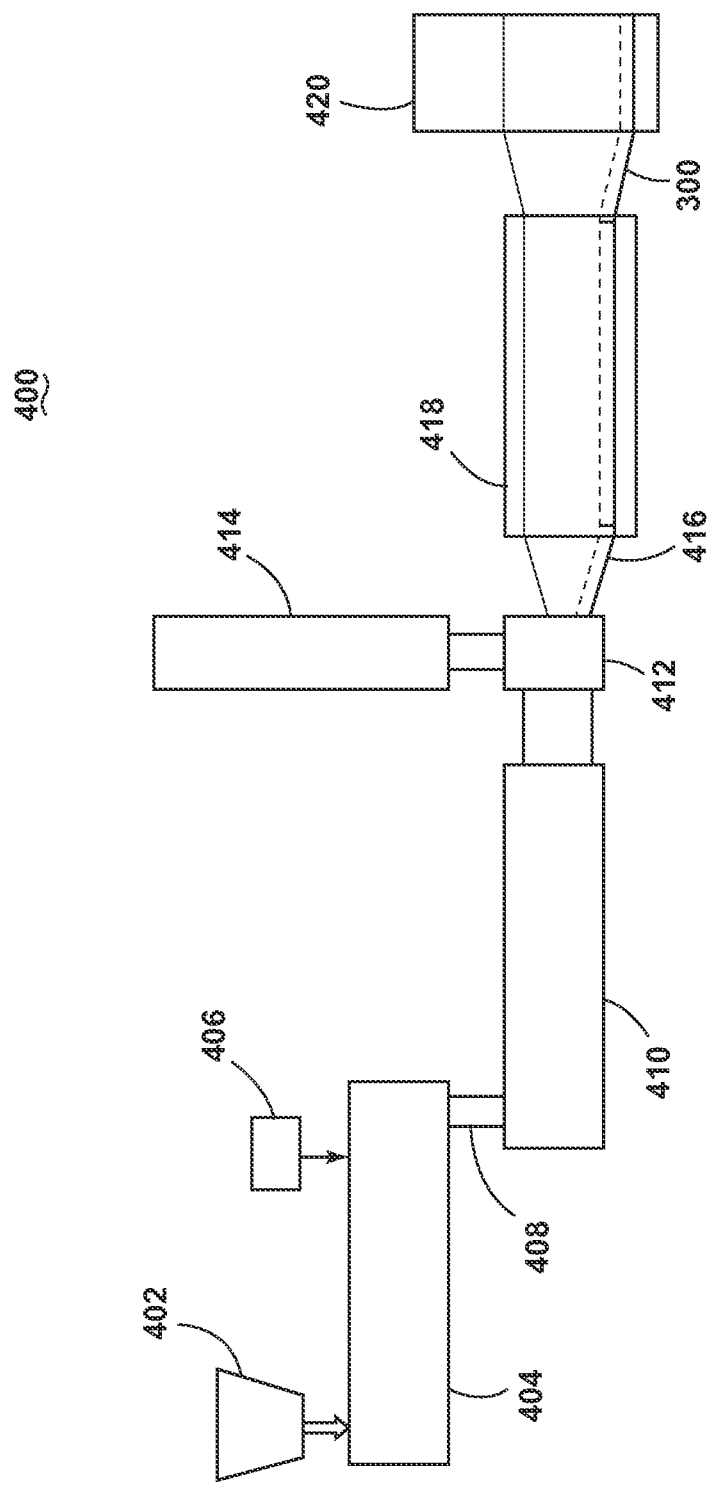
FIG. 10 is a flow chart illustrating a process for forming a multi-layer sheet for use in forming a container according to an embodiment of the invention.

Referring now to FIG. 10, a process 400 for co-extruding the multi-layer sheet 300 comprising an expanded core layer 302 and an unexpanded skin layer 304 is illustrated in a tandem extrusion line. The sequence of steps depicted for this process and any process described herein is for illustrative purposes only, and is not meant to limit the method in any way as it is understood that the steps may proceed in a different logical order or additional or intervening steps may be included without detracting from the invention.

The process can begin at 402 by combining the base resin for the expanded core layer 302 with the desired additives, such as a nucleating agent, and then providing the blended resin to the primary melting extruder 404. The blended resin is heated to form a core layer plasticated mixture or melt that is moved through the primary melting extruder 404. The blowing agent 406 is added to the core layer melt to form an expandable mixture and the expandable mixture is then transferred through a heated crossover 408 to a secondary cooling extruder 410. When a physical blowing agent is used, the blowing agent is mixed with the core layer melt at an elevated pressure sufficient to prevent substantial expansion of the melt and to disperse the blowing agent within the core layer melt. The expandable mixture is then moved through the secondary cooling extruder 410 to a heated die 412. A co-extruder 414 is joined with the heated die 412 to provide a skin layer melt comprising the base resin and the desired additives for the unexpanded skin layer 304 to the heated die 412 for co-extrusion with the expandable mixture from the secondary cooling extruder 410.

The expandable mixture and the skin layer melt are extruded through the heated die 412 to form a multi-layer extrudate 416. The heated die 412 can be a flat die that produces an extrudate sheet or an annular die that extrudes a tube that is then slit to form a sheet. When a physical blowing agent is used, the expandable mixture and skin layer melt are extruded to a zone of lower pressure sufficient to allow the blowing agent to generate a gas to produce cells within the extruded expandable mixture to form the expanded foam material. When a chemical blowing agent is used, the expandable mixture and skin layer melt can be extruded to a zone of elevated temperature such that the blowing agent can decompose and generate a gas to produce cells within the extruded expandable mixture to generate the expanded foam material. The multi-layer extrudate 416 can then be cooled on a cooling mandrel 418 to form the multi-layer sheet 300 having an expanded core layer 302 and unexpanded skin layer 304 which can be wound on a winder at 420 for storage and later use in forming the bottom element blank 50 and the sleeve blank 52 for forming the container 10.

Alternatively, rather than co-extruding the expanded core layer 302 and the unexpanded skin layer 304, the layers 302 and 304 can be formed separately and combined using a lamination or extrusion coating process to form the multi-layer sheet 300. The lamination process can include the use of heat, pressure and/or adhesives to facilitate adhering the expanded core layer 302 and the unexpanded skin layer 304 together to form the multi-layer sheet 300.

While the co-extrusion process 400, extrusion coating process, and lamination process are described in the context of a multi-layer material 300 having an expanded core layer 302 and a single unexpanded skin layer 304, it will be understood that the co-extrusion process 400, extrusion coating process, and lamination process can be used in a similar manner to form a multi-layer material 300 having more than one unexpanded skin layer 304 on one or both sides of the expanded core layer 302. The unexpanded skin layer(s) 304 can act as a gas barrier to maintain the blowing agent content within the expanded core layer 302 during any secondary expansion that may occur during or after the thermoforming process. The unexpanded skin layer(s) 304 can also increase the overall stiffness and strength of the multi-layer material 300.

EXAMPLES

The following examples illustrate embodiments of the present invention and are not necessarily representative of the full scope of the present invention.

Example cups were made according to the embodiments of the invention in a 16 fluid ounce and 20 fluid ounce size. The Example cups had a side wall made from a multi-layer polypropylene-based material that included an expanded core layer made using DAPLOY™ WB140 and a co-extruded unexpanded skin layer made using BC3BRF.

Comparative 16 fluid ounce and 20 fluid ounce cups are commercially available cups and are made from an expanded polypropylene-based material that does not include a co-extruded unexpanded skin layer.

Methods

The weight and side wall thickness for the 16 and 20 ounce size Example and Comparative cups was determined based on an average of the measurements for 3 different cups for each sample. The flush fill volume was determined for the 16 and 20 ounce Example and Comparative cups based on the volume of water required to fill the cup flush with the upper edge of the lip of the cup. The average flush fill volume was determined based on the measurements for 3 different cups for each sample.

The side wall deflection test is indicative of the strength of the side wall of the cup. The side wall deflection test measures the peak kilogram force during deflection of the cup side wall by 0.25 inches. The cup is filled with hot water at a temperature of 190° F.±5° F. to a fill level ½" below the lip of the cup. The cup is placed on a sliding gauge table that slides the force gauge sensor towards the cup at 7 inches/min. A force gauge with a 10 lb capacity was used. Deflection measurements were determined at 120 degree intervals around the circumference of the cup side wall below the lip of the cup for a total of 3 measurements per cup. The deflection force values increase with increasing strength of the side wall.

TABLE 2

Comparison of 16 oz. cups*.

| | Example 16 oz. cup | Comparative 16 oz. cup |
|---|---|---|
| Average weight (g) | 9.69 | 12.04 |
| Side wall thickness (inches) | 0.052 | 0.064 |
| Average 0.25" deflection force (kgF) | 0.304 | 0.384 |
| Average flush fill volume (oz.) | 16.4 | 17.1 |

*Results based on the statistical average for 25 cup samples per Example and Comparative group.

TABLE 3

Comparison of 20 oz. cups*.

| | Example 20 oz. cup | Comparative 20 oz. cup |
|---|---|---|
| Average weight (g) | 12.59 | 13.73 |
| Side wall thickness (inches) | 0.057 | 0.068 |
| Average 0.25" deflection force (kgF) | 0.484 | 0.395 |
| Average flush fill volume (oz.) | 20.6 | 20.5 |

*Results based on the statistical average for 25 cup samples per Example and Comparative group.

Tables 4 and 5 below compare the insulation characteristics for the 16 and 20 ounce Comparative cups and the 16 oz. Example cup. The insulation characteristics are determined by measuring a temperature of a liquid inside the cup and a temperature of an exterior surface of a side wall of the cup at predetermined time intervals after the cup is filled with hot water at a temperature of 190° F.±5° F. to a fill level ½" below the lip of the cup.

TABLE 4

Internal temperature for Example and Comparative cups.

| Elapsed time (min.) | Comparative 16 oz. cup | Comparative 20 oz. cup | Example 16 oz. cup |
|---|---|---|---|
| 0 | 185.0 | 186.0 | 185.9 |
| 10 | 170.4 | 171.4 | 171.7 |
| 20 | 159.2 | 160.3 | 161.0 |
| 30 | 149.9 | 150.9 | 151.9 |
| 40 | 142.0 | 142.8 | 143.9 |
| 45 | 138.5 | 139.2 | 140.3 |

TABLE 5

External temperature for Example and Comparative cups.

| Elapsed time (min.) | Comparative 16 oz. | Comparative 20 oz. cup | Example 16 oz. cup |
|---|---|---|---|
| 0 | 163.8 | 162.8 | 165.1 |
| 10 | 154.9 | 153.2 | 155.0 |
| 20 | 144.9 | 147.3 | 146.6 |
| 30 | 138.9 | 138.3 | 139.0 |
| 40 | 130.9 | 133.1 | 133.0 |
| 45 | 129.0 | 130.4 | 129.9 |

As illustrated in Tables 2 and 3, the Example 16 and 20 ounce cups are lighter and have a thinner side wall than the corresponding Comparative 16 and 20 ounce cups while the strength of the cup side wall (as indicated by the average 0.25" deflection force) is equivalent between the Example and Comparative cups. In addition, as illustrated by the temperature data in Tables 4 and 5, the Example cup has thermal insulation properties equivalent to the Comparative cups. The test results indicate that the Example cups including an expanded polypropylene-based core and unexpanded polypropylene-based skin can provide equivalent strength and thermal insulation properties in a cup that is lighter and has a thinner cup side wall, which can provide savings in transportation and storage costs. The weight of the cup can directly affect the cost of transporting the cup and the raw material cost while thickness of the side wall can affect the number of cups that can be packed within a given space, which can effect both storage and transportation costs.

Figure 11A:
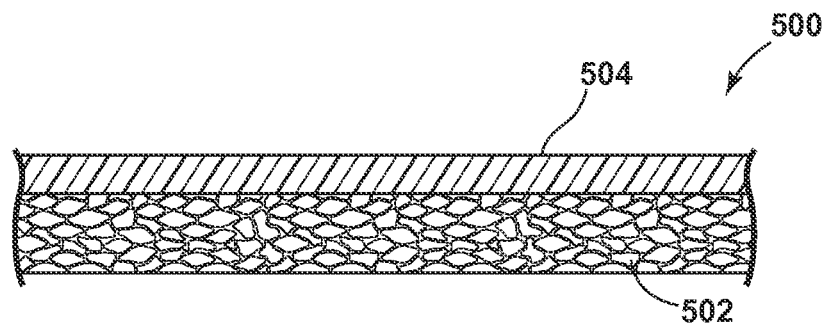
FIGS. 11A and 11B illustrate a multi-layer material for use in forming a container according to an embodiment of the invention.
Figure 11B:
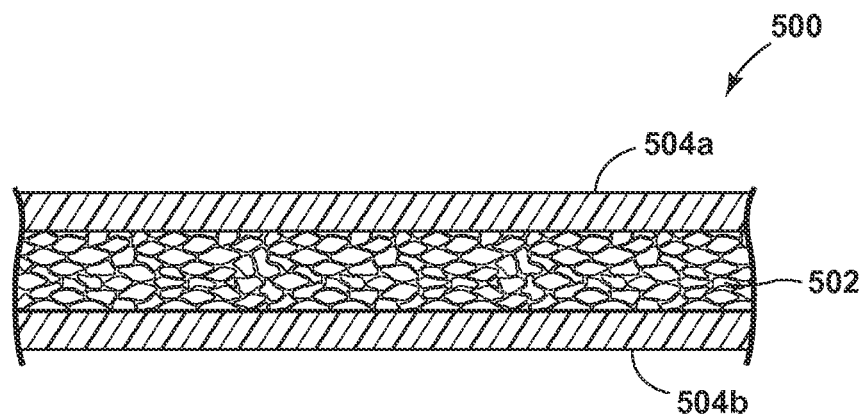

FIGS. 11A and 11B illustrate a multi-layer material 500 that is similar to the multi-layer material 300 of FIGS. 9A and 9B, respectively, except for a low gloss unexpanded skin layer 504. Therefore, elements of the multi-layer material 500 similar to those of the multi-layer material 300 are labeled with the prefix 500. The multi-layer material 500 includes an expanded polymeric layer 502 that can be the same as the expanded core layer 302 described herein. The multi-layer material 500 can include one or more layers of the low gloss unexpanded skin layer 504 that can be laminated, extrusion coated, or co-extruded with the core layer 502 in the same manner as described above for the multi-layer material 300.

As used herein, the term "low gloss" with respect to an unexpanded polypropylene-based layer refers to a material having a gloss level of about 18 gloss units or less as determined as a percent of the reflection of incident light at an angle of 60 degrees with respect to the surface being measured. In a preferred embodiment, the low gloss unexpanded skin layer 504 can have a gloss level of 15 gloss units or less, 13 or even 10 gloss units or less, depending on the desired aesthetic. A low gloss level of about 15 gloss units or less generally correlates with a matte or paper-like finish aesthetic.

The low gloss unexpanded skin layer 504 can be made from a high melt strength polyolefin-based resin or resin blend having long chain branching. Suitable high melt strength polyolefin-based resin/blends have a melt flow rate at 230° C. and 2.16 kg load in the range of 1-13 g/10 min., preferably 2-9 g/10 min. The melt tangent delta, as measured by dynamic mechanical analysis using a parallel plate rheometer at 230° C., 1% strain rate, and 0.1 rad/s frequency, is in the range of 1-6, preferably 1.5-3.5. The melt tangent delta is the tangent of the phase angle (the delay between the applied force and material response) and is the ratio of loss to elasticity, sometimes also referred to as damping. Unless otherwise specified, as used herein, the melt tangent delta, is measured by dynamic mechanical analysis using a parallel plate rheometer at 230° C., 1% strain rate, and 0.1 rad/s frequency according to ASTM D4440-2015 or ISO 6721. Suitable high melt strength polyolefin-based resin/blends further have a melt complex viscosity, as measured by dynamic mechanical analysis using a parallel plate rheometer at 230° C., 1% strain rate, and 0.1 rad/s frequency, in the range of 1980 to 12,000 Pascal-second (Pa·sec.), preferably 2,000-6,500 Pa·sec., even more preferably 2,500-4,000 Pa·sec. Unless otherwise specified, the melt complex viscosity, as used herein, is measured by dynamic mechanical analysis using a parallel plate rheometer at 230° C., 1% strain rate, and 0.1 rad/s frequency according to ASTM D4440-2015 or ISO 6721.

The preferred high melt strength polyolefin-based resin/blend has a cross over point of melt elasticity modulus and loss modulus, as measured by dynamic mechanical analysis using a parallel plate rheometer at 230° C. and 1% strain rate, located between a frequency of 30-150 radians/second (rad/s) and 9,000-23,000 MPa, preferably located between a frequency of 35-120 rad/s and 9,500-18,000 MPa. The melt strength of the preferred high melt strength polyolefin-based resin/blend, as measured by Rheotens Force at 30 bar, is in the range of 6-40 cN, preferably 9-36 cN according to ISO 16790. The preferred high melt strength polyolefin-based resin/blend has a melting point of greater than 160° C., preferably greater than 163° C., more preferably in the range of 163-168° C., and a crystallization temperature greater than 120° C., preferably greater than 125° C., more preferably within the range of 127-135° C. Suitable high melt strength polyolefin-based resin/blends have a flexural modulus greater than 1200 Mpa, preferably greater than 1700 Mpa.

An exemplary polyolefin-based resin for forming the low gloss unexpanded skin layer 504 is DAPLOY™ WB140, available from Borealis A/S, Denmark. In a preferred embodiment, the polyolefin-based resin includes DAPLOY™ WB140 regrind from previously extruded material that can include expanded and/or unexpanded material. As used herein, regrind is a term that applies to material that has been mechanically reduced in size to particles that can be re-introduced into the processing stream for extrusion. The source of the regrind can be pre-consumer waste, such as process scrap or rejected parts, or recycled post-consumer waste. In this example, material made from expanded and/or unexpanded DAPLOY™ WB140, either pre- or post-consumer waste, can be reground and used to co-extrude the low gloss unexpanded skin layer 504. The polyolefin-based regrind can be used in combination with virgin material at a loading rate of up to 30 wt. % or more, depending on the material and the desired gloss. Alternatively, polyolefin-based resin for forming the low gloss unexpanded skin layer 504 can be made from entirely virgin resin.

In a preferred example, the exemplary polyolefin-based resin for forming the low gloss unexpanded skin layer 504 is a high melt strength polypropylene with long chain branching, such as DAPLOY™ WB140, that includes at least a portion of the material from regrind of unexpanded and/or expanded DAPLOY™ WB140. In one example, the polyolefin-based resin can include at least 30 wt. % regrind of the high melt strength polypropylene with long chain branching blended with virgin material of the same or different resin. Regardless of the ratio of virgin high melt strength polypropylene with long chain branching and regrind material, the polyolefin-based resin for forming the low gloss unexpanded skin layer 504 has a melt flow rate of 6-12 g/10 min., a tangent delta of 2.0-4.0, and a melt complex viscosity of 2200-4200 Pa·sec.

In another example, the polyolefin-based resin for forming the low gloss unexpanded skin layer 504 is a high melt strength polypropylene blend of a long chain branched (LCB) polypropylene with either a homopolymer or a co-polymer. Non-limiting examples of such a high melt strength polypropylene blend include resins identified by the trade name WAYMAX, available from Japan Polypropylene Corp., such as grades MFX-3, MFX-6, or MFX-8, or EX4000, EX6000, or EX8000, also available from Japan Polypropylene Corp. The MFX family of materials are a long chain branched polypropylene blended with polypropylene homopolymer, while the EX family is a long chain branched polypropylene blended with a polypropylene-based co-polymer. MFX-3 (also available under the trade name X5258) has melt flow rate at 230° C. and 2.16 kg load of 8 g/10 min. and a melt tension of 5 g. MFX-6 has a melt flow rate at 230° C. and 2.16 kg load of 3 g/10 min. and a melt tension of 13 g, while MFX-8 has a melt flow rate at 230° C. and 2.16 kg load of 1 g/10 min. and a melt tension of 24 g. EX8000 (also available under the trade name X5261) has a melt flow rate at 230° C. and 2.16 kg load of 1 g/10 min. and a melt tension of 15 g. EX6000 (also available under the trade name STH0817) has a melt flow rate at 230° C. and 2.16 kg load of 3 g/10 min. and a melt tension of 8 g, while EX4000 (also available under the trade name X5259) has a melt flow rate at 230° C. and 2.16 kg load of 6 g/10 min. and a melt tension of 4 g.

In yet another example, the exemplary polyolefin-based resin for forming the low gloss unexpanded skin layer 504 is a blend of a polypropylene copolymer and a long chain branched low density polyethylene (LDPE). The blend can have a melt flow rate of 6 g/10 min., a melt tangent delta of 1.6, a melt complex viscosity of 7600 Pa·sec. A suitable blend is commercially available from A. Schulman, trade name DUL3636 DP20A, which is described as a blend of a random polypropylene copolymer and a long chain branched LDPE. The blend of a polypropylene copolymer and long chain branched LDPE can be used alone or mixed with DAPLOY™ WB140 or another polypropylene-based material having a high stiffness as demonstrated by a high flexural modulus greater than 1200 Mpa.

The low gloss unexpanded skin layer 504 can include additional additives, non-limiting examples of which include colorants and opacifying additives. Examples of suitable opacifying agents include 3-5 wt. % Ferro CH270432FDA masterbatch, titanium dioxide, calcium carbonate, zinc sulfide, barium sulfate, and antimony oxide.

Table 6 below illustrates melt tangent delta, melt complex viscosity, and gloss level for unexpanded skin layers made from various polyolefin-based resins. Melt tangent delta and melt viscosity was determined as described above. The gloss level was determined using a gloss meter at a 60 degree measurement angle. The gloss meter was used to take a gloss level measurement at multiple locations of the test sample and the highest reading was recorded. The measurement values for the gloss meter are related to the amount of reflected light from a calibration standard for defining a standard gloss unit according the instructions provided by the manufacturer of the gloss meter, as is known in the art. The data in Table 6 was obtained using an Elcometer 406 60 degree micro NOVO-GLOSS™ gloss meter or a BYK Gardner 60° 4442 micro-gloss 60 degree gloss meter.

TABLE 6

Characteristics of Example Unexpanded Skin Layers

| Example | Unexpanded Skin Polyolefin Resin(s) | Melt Tangent Delta | Melt Complex Viscosity (Pa · sec.) | Gloss level (gloss units) |
|---|---|---|---|---|
| Example 1 | 75% DUL3636 DP20A + 25% Sukano P-ma-S218[1] | 1.98 | 5,794 | 6.5 |
| Example 2 | 20% DUL3636 DP20A + 80% DAPLOY ™ WB140 | 3.52 | 2,639 | 7.2 |
| Example 3 | 75% DUL3636 DP20A + 25% HM10LC[2] | 2.17 | 6,982 | 7.3 |
| Example 4 | DAPLOY ™ WB140 (virgin) | 3.01 | 3,411 | 7.5 |
| Example 5 | DUL3636 DP20A | 1.76 | 6,252 | 7.5 |
| Example 6 | 30% DUL3636 DP20A + 70% WB140 | 3.84 | 2,715 | 8.1 |
| Example 7 | EX6000 | 2.10 | 6,804 | 8.4 |
| Example 8 | EX6000 (different batch than Example 7) | 2.95 | 3,327 | 8.8 |
| Example 9 | 30% DUL3636 DP20A + 70% PP4712E1[3] | 5.54 | 5,951 | 9 |
| Example 10 | 40% DUL3636 DP20A + 60% PP4712E1[3] | 2.92 | 3,048 | 9.6 |
| Example 11 | 40% DUL3636 DP20A + 60% BB213CF[4] | 4.39 | 8,493 | 9.7 |
| Example 12 | 75% DAPLOY ™ WB140 (regrind) + 25% DUL3636 DP20A | 2.92 | 3,497 | 10.5 |
| Example 13 | 50% DAPLOY ™ WB140 (regrind) + 50% DAPLOY ™ WB140 (virgin) | 3.75 | 2,620 | 10.8 |
| Example 14 | 20% PP4712E1[3] + 80% DUL3636 DP20A | 3.08 | 4,476 | 11.2 |
| Example 15 | 75% DAPLOY ™ WB140 (regrind) + 25% PP4712E1[3] | 3.85 | 3,742 | 11.4 |
| Example 16 | BB213CF[4] | 3.93 | 11,990 | 12.2 |
| Example 17 | 75% DAPLOY ™ WB140 (regrind) + 25% DAPLOY ™ WB140 (virgin) | 3.85 | 2,178 | 12.9 |
| Example 18 | EX4000 | 2.69 | 3,519 | 13.4 |
| Example 19 | 30% DUL3636 DP20A + 70% BB213CF[4] | 4.34 | 9,315 | 13.4 |
| Example 20 | DAPLOY ™ WB140 (regrind) | 4.97 | 1,981 | 13.7 |
| Example 21 | DAPLOY ™ WB140/ DUL3636 DP20A (regrind)[5] | 3.98 | 2,535 | 15 |
| Example 22 | 90% DAPLOY ™ WB140 (regrind) + 10% DAPLOY ™ WB140 (virgin) | 4.01 | 2,657 | 15 |
| Example 23 | 80% DAPLOY ™ WB140 (regrind) + 20% DAPLOY ™ WB140 (virgin) | 3.75 | 2,773 | 15 |
| Example 24 | 70% DAPLOY ™ WB140 (regrind) + % DAPLOY ™ WB140 (virgin) | 3.84 | 2,417 | 15 |
| Example 25 | 20% DUL3636 DP20A + 80% DAPLOY ™ WB140 | 3.30 | 2,485 | 16 |
| Example 26 | 20% DUL3636 DP20A + 80% PP4712E1[3] | 7.17 | 4,751 | 16 |
| Example 27 | 30% DUL3636 DP20A + 70% PP4712E1[3] | 6.26 | 4,315 | 16 |
| Example 28 | 30% DUL3636 DP20A + 70% DAPLOY ™ WB140 | 3.76 | 2,788 | 16.1 |
| Example 29 | PP4712E1[3] | 5.54 | 5,962 | 16.7 |
| Example 30 | EX8000 | 2.33 | 4,946 | 16.8 |
| Example 31 | Polyone 158119 MATPP[6] | 0.87 | 12,770 | 17.2 |
| Example 32 | 40% DUL3636 DP20A + 60% PP4712E1[3] | 5.44 | 4,885 | 17.6 |
| Example 33 | 50% DUL3636 DP20A + 50% PP4712E1[3] | 4.91 | 2,457 | 20.1 |
| Example 34 | PP22524E[7] | 10.21 | 3,200 | 22.4 |
| Example 35 | C7054-07NA[8] | 7.51 | 3,035 | 22.6 |
| Example 36 | 75% DAPLOY ™ WB140 (regrind) + 25% BB213CF4 | 3.59 | 4,915 | 22.9 |
| Example 38 | BE170CF[10] (Borealis copolymer) | 10.76 | 1,342 | 24.2 |
| Example 39 | BC3BRF | 6.66 | 1,629 | 24.4 |
| Example 40 | DAPLOY ™ WB140 (regrind) | 4.39 | 2,351 | 26.8 |
| Example 41 | DAPLOY ™ WB140 (foam regrind) | 4.59 | 2,206 | 28.6 |
| Example 42 | Braskem D115A[11] | 20.80 | 1,351 | 29.1 |
| Example 43 | 50% DAPLOY ™ WB140 (regrind) + 50% PP4712E1[3] | 4.43 | 4,730 | 39.3 |
| Example 44 | Borealis HD905CF[12] | 6.13 | 3,392 | 49.1 |
| Example 45 | Borealis BD712CF[13] | 7.03 | 2,492 | 58.3 |

[1]Sukano P-ma-S218 is a talc-based masterbatch matting agent for polypropylene available from Sukano Products Ltd., Switzerland.
[2]HM10LC is a CaCO₃ masterbatch for polypropylene available from Heritage Plastics, U.S.A.
[3]P4712E1 is an oriented film grade polypropylene homopolymer having a melt flow rate at 230° C. and 2.16 kg load of 2.8 g/10 min., available from ExxonMobil ™, U.S.A.
[4]BB213CF is a film grade heterophasic polypropylene copolymer available from Borealis.
[5]A mixture of regrind from 75/25, 60/40, 45/55 DAPLOY ™ WB140/DUL3636 DP20A scraps.
[6]Polyone 158119 MATPP is a matting agent containing a talc-based mineral filler and rubber/elastomer, available from Polyone Corp., U.S.A.
[7]PP2252E4 is a polypropylene homopolymer having a melt flow rate at 230° C. and 2.16 kg load of 4.2 g/10 min., available from ExxonMobil ™, U.S.A.
[8]C7054-07NA is a polypropylene-based impact copolymer having a melt flow rate at 230° C. and 2.16 kg load of 4.2 g/10 min., available from Braskem.
[10]BE170CF is a polypropylene-based copolymer available from Borealis.
[11]D115A is a polypropylene homopolymer without a crystalline nucleation additive having a melt flow rate at 230° C. and 2.16 kg load of 11 g/10 min., available from Braskem.
[12]HD905CF is high crystalline polypropylene homopolymer having a melt flow rate at 230° C. and 2.16 kg load of 6.5 g/10 min. and high stiffness, available from Borealis.
[13]BD712CF is a heterophasic polypropylene-based copolymer having a melt flow rate at 230° C. and 2.16 kg load of 13 g/10 min., available from Borealis.

Figure 12:
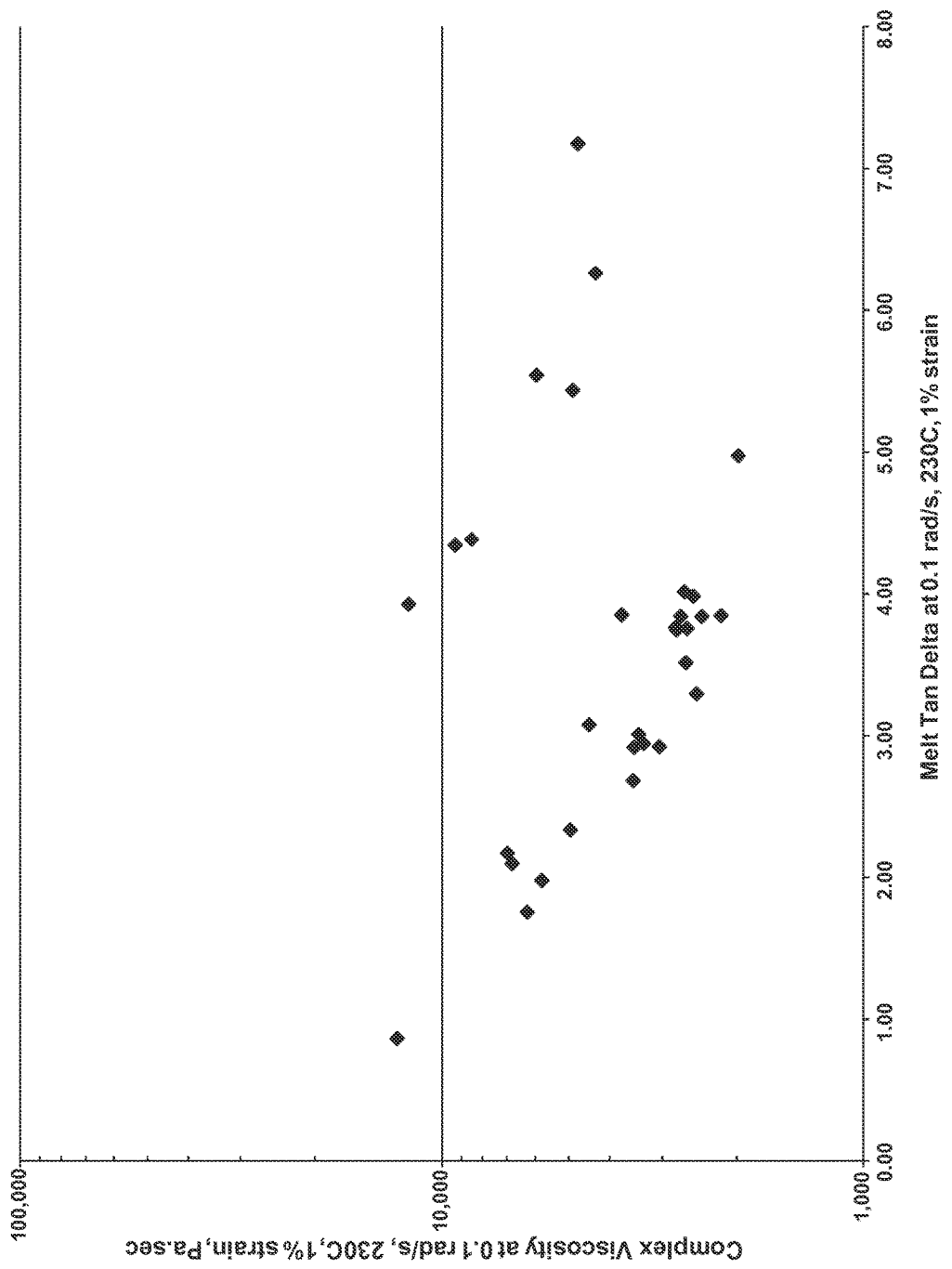
FIG. 12 illustrates a chart of melt tangent delta and complex melt viscosity for exemplary unexpanded skin layers according to an embodiment of the invention.

FIG. 12 illustrates the relationship between the melt tangent delta and the melt complex viscosity of the polyolefin-based resin for forming a low gloss unexpanded skin layer of Examples 1-32 of Table 6 which have a gloss level of about 18 gloss units or less. As demonstrated by the data in FIG. 12, materials having a gloss level of about 18 or less generally had a melt tangent delta in the range of 1 to 8 and a melt complex viscosity in the range of 1980 to 13,000 Pa·sec. Preferred materials having a gloss level of about 16 or less generally had a melt tangent delta in the range of 1 to 6, preferably in the range of 1.5 to 3.5, and a melt complex viscosity in the range of 2000 to 6500 Pa·sec., preferably in the range of 2000-4000 Pa·sec.

Figure 13:
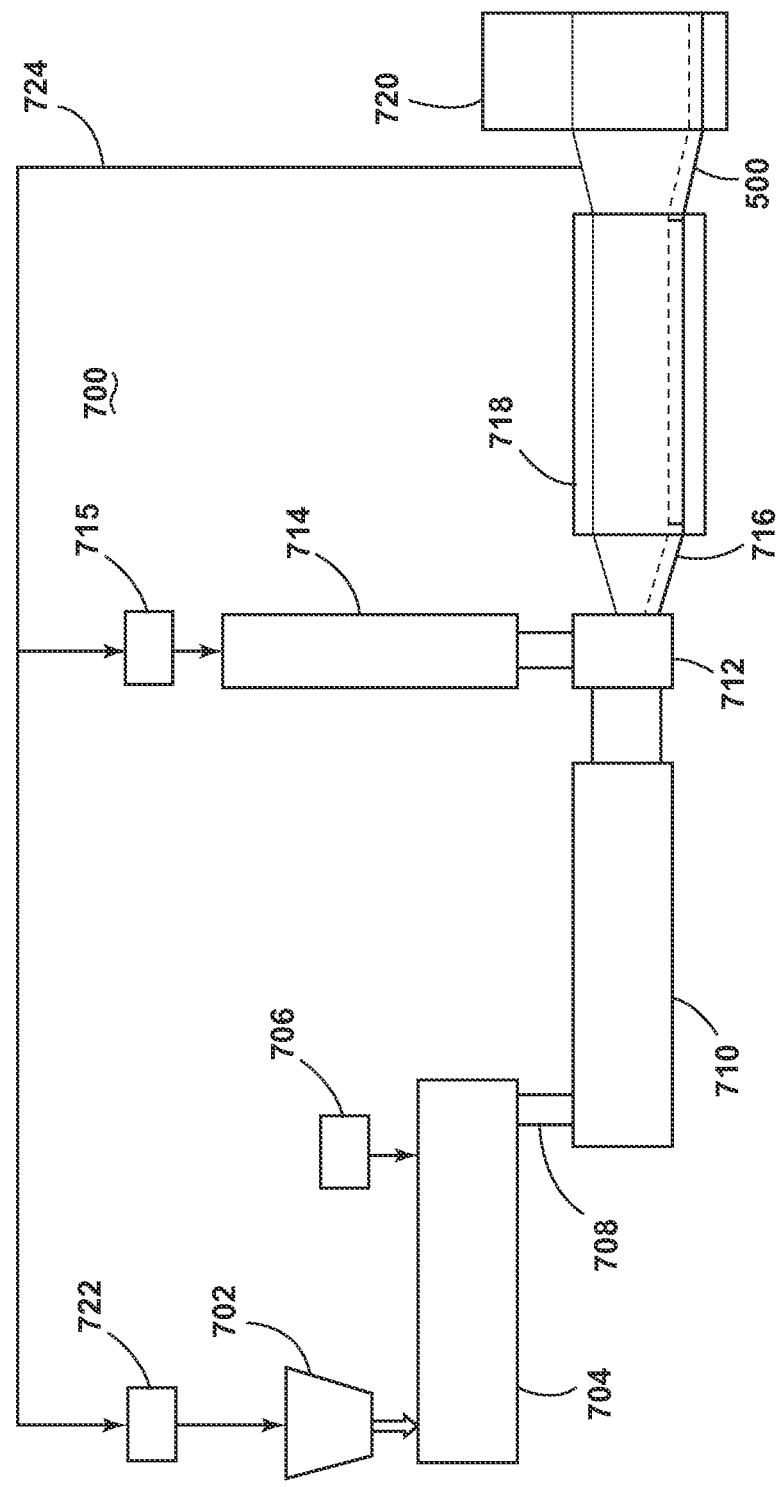
FIG. 13 is a flow chart illustrating a process for forming a multi-layer sheet for use in forming a container according to an embodiment of the invention.

FIG. 13 illustrates a process 700 for co-extruding the multi-layer sheet 500 comprising an expanded core layer 502 and at least one low gloss unexpanded skin layer 504 made using a polyolefin-based resin comprising at least a portion of regrind material. The process for forming the multi-layer sheet 500 is similar to the process 400 for forming the multi-layer sheet 300 except for the formation of the low gloss unexpanded skin layer 504. Therefore, steps in the process 700 similar to those of the process 400 are labeled with the prefix 700.

The process can begin at 702 by combining the base resin for the expanded core layer 502 with the desired additives, such as a nucleating agent, and then providing the blended resin to the primary melting extruder 704. The resin supplied to the primary melting extruder 704 can include virgin resin or a mixture of virgin and regrind resin. As is described in more detail below, regrind material can be provided at 722 such that at least a portion of the blended resin provided to the primary melting extruder 704 comprises a regrind material. The blended resin is heated to form a core layer plasticated mixture or melt that is moved through the primary melting extruder 704. The blowing agent 706 is added to the core layer melt to form an expandable mixture and the expandable mixture is then transferred through a heated crossover 708 to a secondary cooling extruder 710. When a physical blowing agent is used, the blowing agent is mixed with the core layer melt at an elevated pressure sufficient to prevent substantial expansion of the melt and to disperse the blowing agent within the core layer melt. The expandable mixture is then moved through the secondary cooling extruder 710 to a heated die 712. A co-extruder 714 is joined with the heated die 712 to provide a skin layer melt comprising the base resin and the desired additives for the low gloss unexpanded skin layer 504 to the heated die 712 for co-extrusion with the expandable mixture from the secondary cooling extruder 710.

The co-extruder 714 is provided with a high melt strength polypropylene-based resin comprising at least a portion of regrind material at 715. In a preferred embodiment, the high melt strength polypropylene regrind is obtained from pre- or post-consumer waste regrind from a previously formed multi-layer sheet 500 including an expanded core layer 502 and a low gloss unexpanded skin layer 504. Alternatively, the regrind can be from a previously formed expanded core layer 502 that does not include a low gloss unexpanded skin layer 504. Preferably, the material used in the regrind at 715 has the same formulation as the layers 502 and/or 504 of the multi-layer sheet 500 of the current process 700. However, it is within the scope of the invention for the material used in the regrind at 715 to have a different formulation than that of the current process 700.

The expandable mixture and the skin layer melt are then extruded through the heated die 712 to form a multi-layer extrudate 716. The heated die 712 can be a flat die that produces an extrudate sheet or an annular die that extrudes a tube that is then slit to form a sheet. The multi-layer extrudate 716 can then be cooled on a cooling mandrel 718 to form the multi-layer sheet 500 having an expanded core layer 502 and low gloss unexpanded skin layer 504 which can be wound on a winder at 720 for storage and later use in forming sleeve and/or bottom element blanks for use in forming a container. As indicated at 724, scraps and/or waste from the co-extrusion and expansion process forming the multi-layer sheet 500 can be collected and provided as regrind at 715 and/or 722. It is within the scope of the invention for one or both of the expanded core layer 502 and/or low gloss unexpanded skin layer 504 to be made from material comprising at least a portion of regrind material.

When producing a multi-layer sheet 500 for use in forming containers, such as a cup, the low gloss unexpanded skin layer 504 has a thickness in the range of 1-3 mils, preferably 1.5-2.2 mils, and more preferably 1.7-2 mils. The total thickness of the multi-layer sheet 500 is typically about 55 mils or greater, preferably 60-70 mils, and more preferably 64-68 mils for use in forming cups and other containers. In a preferred embodiment, a total thickness of the multi-layer sheet 500 is 66+/−4 mil. The multi-layer sheet 500 can have a base weight of 12.48+/−1.0 g per 60 square inches and a density of about 10-13 lb/ft$^3$.

While the process 700 is described in the context of using a regrind material to form the low gloss unexpanded skin layer 504, the process 700 can be used in a similar manner to form a multi-layer sheet 500 having a low gloss unexpanded skin layer 504 made using only virgin material. For example, as described above, a low gloss unexpanded skin layer 504 can also be formed by providing a blend of a polypropylene copolymer and a long chain branched LDPE, such as DUL 3636 DP20A, or virgin DAPLOY™ WB140 at 715.

Figure 14:
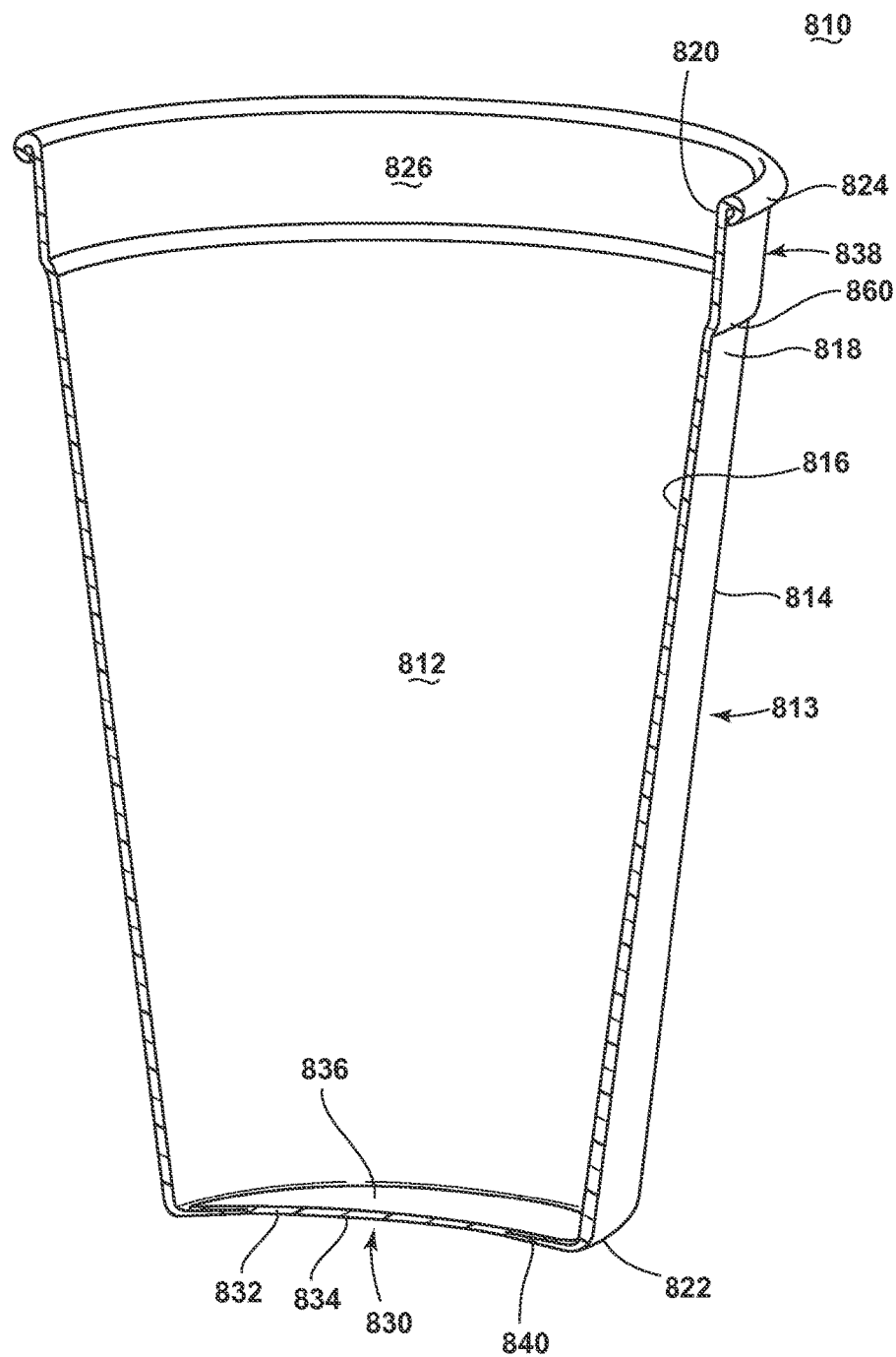
FIG. 14 is a cross-sectional view of a container according to an embodiment of the invention.

FIG. 14 illustrates a cup 810 that is similar to the cup 10 of FIG. 1 except for the structure of the bottom element and the stacking element. Therefore, elements of the cup 810 similar to those of cup 10 are labeled with the prefix 800. The cup 810 is an example of a container that can be formed using the multi-layer sheet 500, although it is understood that the uses of the multi-layer sheet 500 are not limited to the cup 810. It is further understood that the cup 810 can also be formed using the multi-layer sheet 300 or a combination of the multi-layer sheets 300 and 500.

Still referring to FIG. 14, the cup 810 includes a sleeve 813 having a peripheral wall 814 and a bottom element 830 for closing off the lower end of the container 810. The bottom element 830 includes a floor 832 having a lower surface 834 facing away from the cavity 812 and an upper surface 836 facing the cavity 812, with the floor 832 providing the bottom element 830 with a slightly upwardly bowed cross-section (shown) or a generally flat cross-section. The sleeve 813 includes a flange 840 that extends from the lower end 822 of the peripheral wall 814 which extends inward and is attached to the lower surface 834 of the bottom element 830 using a heat seal and/or an adhesive.

The cup 810 includes a stacking element 838 in an upper portion of the cup 810 in the form of a shoulder 860 formed in the peripheral wall 814 near the upper end 820. The dimensions of the shoulder 860 and the taper angle of the peripheral wall 814 above and below the shoulder 860 can be configured such that a first cup 810 can be inserted into a second cup 810 until the shoulder 860 of the first cup abuts the lip 824 of the second cup. The shoulder 860 limits the extent to which a first cup 810 can be inserted into a second cup 810 to facilitate removal or de-nesting of a cup 810 from a stack of similar nested cups 810.

Figure 15:
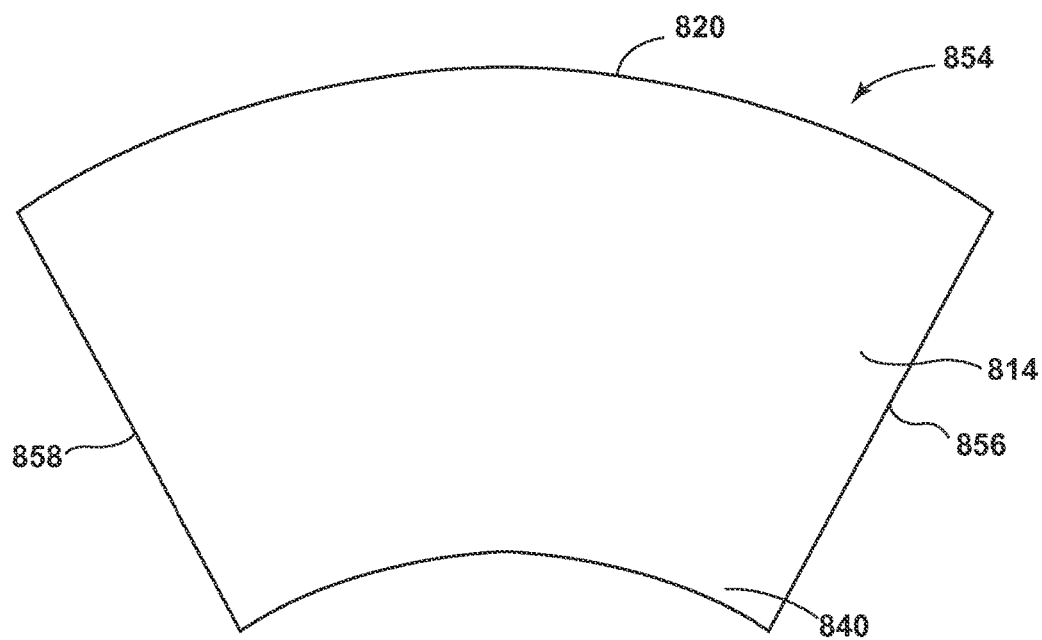
FIG. 15 is a perspective view of a container sleeve blank according to an embodiment of the invention.
Figure 16:
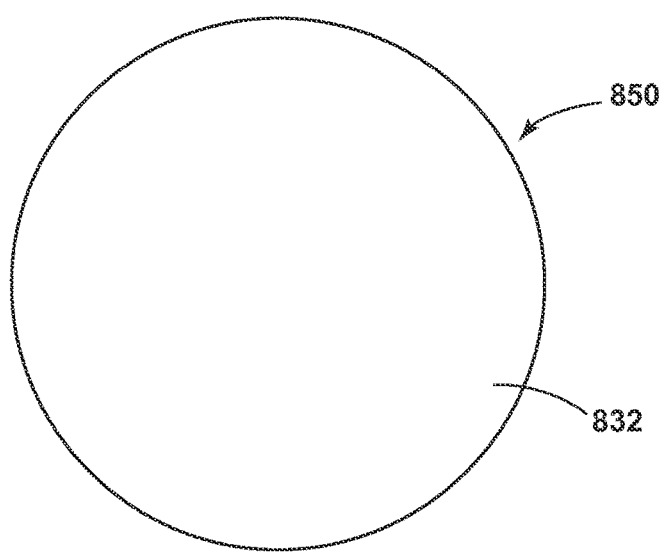
FIG. 16 is a perspective view of a container bottom element blank according to an embodiment of the invention.
Figure 17:
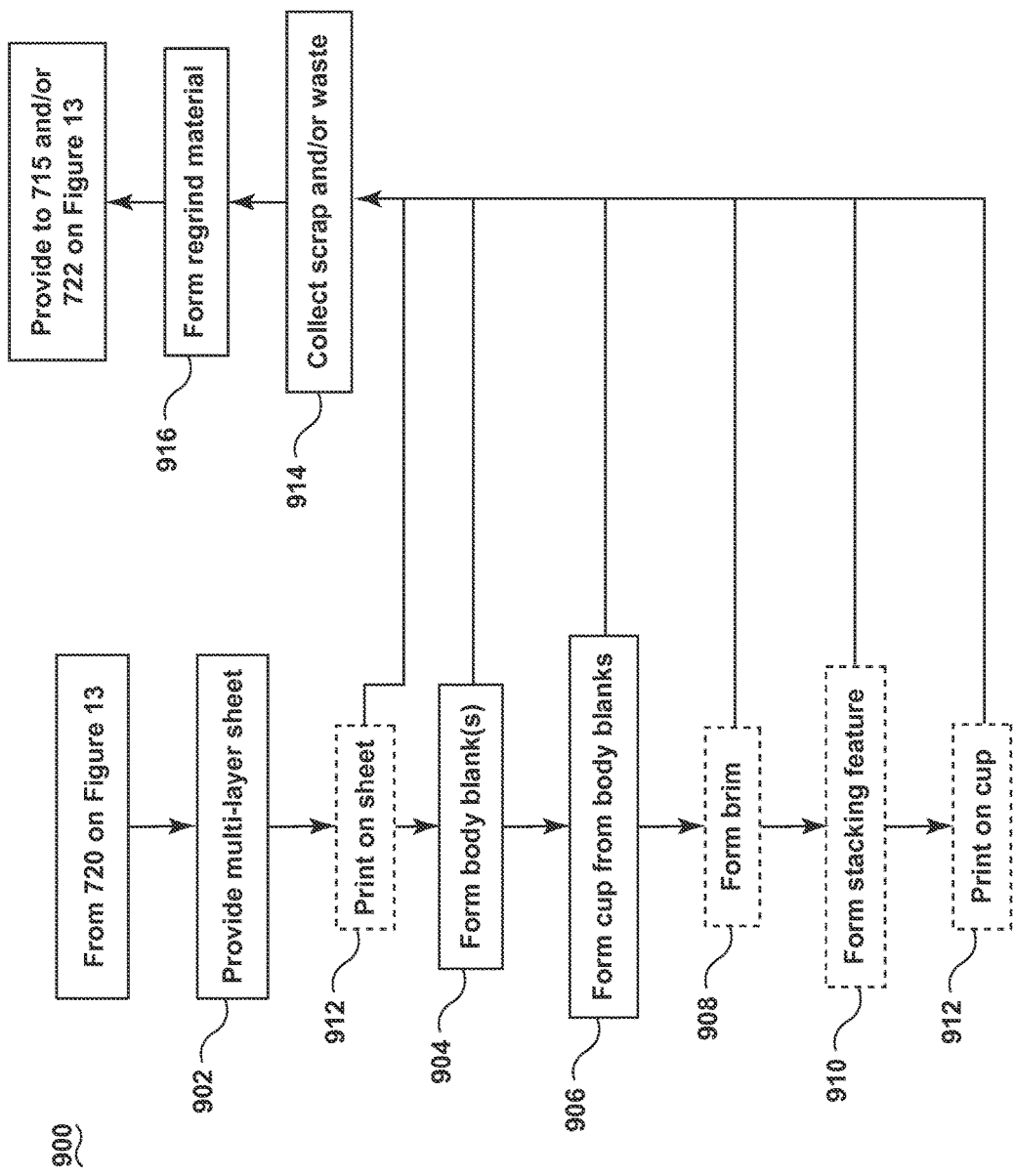
FIG. 17 is a flow chart illustrating a process for forming a container according to an embodiment of the invention.

The cup 810 can be formed from body blanks made from the multi-layer sheet 500 in a manner similar to that described above for forming the cup 10. Referring to FIG. 15, the cup 810 can be formed from a sleeve blank 854 in a manner similar to that described with respect to the sleeve blank 54 of FIGS. 4A-4B. Similarly, the cup 810 can be formed from a bottom element blank 850 in a manner similar to that described with respect to the bottom element blank 50 of FIGS. 3A-3B. Therefore, elements of the bottom element blank 850 and sleeve blank 854 similar to those of the bottom element blank 50 and sleeve blank 54 are labeled with the prefix 800. The sleeve 813 can be formed by cutting the sleeve blank 854 from the multi-layer sheet 500 and, optionally, the bottom element 830 can also be formed by cutting the bottom element blank 850 from the multi-layer sheet 500. Alternatively, as discussed above with respect to the bottom element 30 of the cup 10 of FIGS. 1-2, the bottom element 830 can be made from a single layer of expanded material, such as the expanded core layer 502 rather than the multi-layer sheet 500. When the bottom element 830 is made from an expanded core layer 502, the bottom element 830 can be configured to have the same thickness and base weight as the multi-layer sheet 500 used to form the sleeve 813. For example, the single layer bottom element 830 and multi-layer sleeve 813 can have a thickness of 66+/−4 mil and a base weight of 10.48+/−1.0 g per 60 square inches. The bottom element blank 850 and the sleeve blank 854 can then be assembled to form a cup according to either of the processes 100 of FIG. 5, 200 of FIG. 7, 900 of FIG. 15, or an alternative process.

FIG. 18 illustrates a process 900 for using the multi-layer sheet 500 to form a container, such as the cup 810, having a low gloss unexpanded skin layer 504 made using a blend of virgin and regrind material. The process 900 can be used alone or in combination with the process 700 of FIG. 13. While the process 900 is described in the context of forming the two-piece cup 810 illustrated in FIG. 14, it will be understood that the multi-layer sheet 500 can be used in a similar manner to form any type of container having a low gloss unexpanded skin layer, non-limiting examples of which include the two-piece cup 10 of FIGS. 1-4. In another example, the container may be in the form of any one or two-piece cup known in the art, non-limiting examples of which include: a one-piece cup, such as that disclosed in U.S. Pat. No. 3,854,583 to Amberg et al., issued Dec. 17, 1974; a two-piece disc-bottom type cup, such as that shown in U.S. Pat. No. 3,854,583 to Amberg et al., issued Dec. 17, 1974 or PCT Application WO 86/06045 to Baker, published Oct. 23, 1986, in which the cup bottom is in the form of a disc and the bottom edges of the cup sleeve are folded under and sealed with an underside of the disc; and a pot-bottom type cup in which the cup bottom is in the form of a disc having a downwardly extending skirt about which the bottom edges of the cup sleeve are folded around and sealed with, such as that shown in U.S. Pat. No. 3,658,615 to Amberg, issued Apr. 25, 1972, all of which are herein incorporated by reference in their entirety.

Still referring to FIG. 15, the process 900 for forming the cup 810 begins at 902 with providing a multi-layer sheet 500 having a low gloss unexpanded skin layer 504 and an expanded core layer 502 made according to the process 700 of FIG. 13. While the process 900 is described in combination with the low gloss unexpanded skin layer 504, it will be understood that the process 900 can be used independently of the process 700 in the context of using regrind material in the formation of the low gloss unexpanded skin layer 504.

At 904, die punches can be used to punch the sleeve blank 854 and the bottom element blank 850 from a suitable sheet of material. The sleeve blank 854 and the bottom element blank 850 can both be punched from the multi-layer sheet 500. Alternatively, it is also within the scope of the invention for the sleeve blank 854 to be punch from the multi-layer sheet 500 and for the bottom element blank 850 to be punched from a different material, such as a single layer of expanded material. In a preferred embodiment, the bottom element blank 850 can be punch from a single layer of expanded material that is the same as the expanded core layer 502 of the multi-layer sheet 500 used to form the sleeve blank 854. In this embodiment, although the bottom element blank 850 is formed from a different sheet than the sleeve blank 854, the blanks 850, 854 include the same expanded core layer 502 and thus scrap and/or waste from the process 900 can still be used to form regrind material for use in producing the expanded core layer 502 alone or in combination with the unexpanded skin layer 504 to form the multi-layer sheet 500.

The body blanks can be provided to a suitable cup forming apparatus for forming the cup 810 from the sleeve blank 854 and the bottom element blank 850 at 906. In one embodiment, the cup forming apparatus can include a plurality of turrets to move the body blanks through a series of stations to form the cup 810. For example, the sleeve blank 854 is provided on a transfer turret and the bottom element blank 850 is provided on a main turret and both the transfer and main turrets are indexed into position under a seam heater(s) to heat the side edges 856, 858 of the sleeve blank 854. Both turrets are then indexed to a folding wing station in which the sleeve blank 854 is folded around the mandrel on the main turret and a seam clamp is used to apply localized pressure to the overlapping side edges 856, 858 of the sleeve blank 854 to form a liquid-tight peripheral wall seam. The main turret with the sleeve blank 854 and bottom element blank 850 is then indexed into position with a first bottom heater to heat the edges of the bottom element blank 850. The main turret is then moved into position with a second bottom heater and two additional heaters placed above and below the sleeve blank 854. The main turret is then indexed into position in a bottom forming station where a spinning tool strokes in and folds the bottom edge 840 of the sleeve blank 854 inward over the bottom element blank 850. The main turret indexes again into position with a second bottom forming station in which a tool strokes in and sets the bottom of the cup 810 by applying pressure to the overlapping bottom edge 840 of the sleeve blank 854 and the bottom element 850 to form a shell.

The main turret can index to a transfer station to transfer the formed shell from the main turret to a pocket turret using air for subjecting the shell to additional process steps to form the final cup structure, such as brim forming at 908, stacking feature formation at 910, and printing at 912. For example, at 908, the pocket turret can index to a tamp/lube station where the shell is seated into the pocket and a lubricant or slipping agent, non-limiting examples of which include mineral oil and silicon oil, is applied around the upper edge 820 of the shell. The pocket turret then indexes to a pre-curling station in which a pre-curler to initiate the curl in the upper edge 820 of the shell. The pocket turret indexes again to a pre-curling heating station where heat is applied to the upper edge 820 of the shell in preparation for the final curling process. The pocket turret then indexes to a top curl station where the upper edge curl is finished to form the final rolled lip 824.

An example of a stacking feature that can be formed at 910 is the stacking element 838 formed in the peripheral wall 814. The shell can be inserted into a heated mold using air cylinders to tamp the shell into place and held in position within the mold by vacuum. A heated plug can then be lowered inside the opening 826 of the cup 810 to thermoform the shoulder 860 into the area of the peripheral wall 814 below the lip 824. The cup bottom 830 can be heated and ironed while the cup 810 is in the heated mold to flatten and smooth the surface.

At 912, the multi-layer sheet 500 used to form the container 810 can be printed on prior to forming the container 810 or after the container 810 is formed in a manner similar to that described above for the sleeve blank 52 and bottom element blank 50 used to form the container 10 of FIGS. 1-2. When the multi-layer sheet 500 is printed on prior to forming the body blanks at 904, the thus printed sheet can be used immediately to form the sleeve blank 854 and/or bottom element blank 850 or wound onto a roll for storage. Generally only the multi-layer sheet 500 used to form the sleeve blank 854 is printed on, however, it is within the scope of the invention for the material used to form the bottom element blank 850, whether it be the multi-layer sheet 500 or a sheet of a single layer of the expanded core 502, to also be printed on prior to cutting the blanks at 904.

Alternatively, after the container 810 is formed, the container 810 can be fed into a conical container printer using a feed screw system that places the container 810 on print mandrels. Each print mandrel is indexed to a pretreat system for surface treatment of the peripheral wall 814 and then indexed into the print position. At the print position, the side wall 14 can be printed on using a dry offset printing process with UV paste ink, for example. After printing, the container 810 is indexed into a curing position where the print mandrels are rotated in front of a UV light source to cure the ink. Once cured, the mandrels are indexed to an out-feed position and the containers 810 can be nested into stacks for storage.

At 914, any scrap or waste generated during the process 900 can be collected and used to form regrind material at 916 for use in forming a new multi-layer sheet 500 by providing the regrind material to steps 715 and/or 722 of the process 700 of FIG. 13. The material collected during the process 900 can be used alone or in combination with material collected from the process 700 to form regrind material for use in forming the multi-layer sheet 500. For example, scrap left over from cutting the body blanks at 904, scrap or waste left over from the printing process at 903 or 910, and/or defective body blanks formed at 904 can be collected at 914 for use in forming the regrind material 916. Defective cups from any of the steps 908, 910, and/or 912 can also optionally be collected and used to form the regrind material at 916. The process 900 of forming a cup from a material formed according to the process 700 and then providing scrap and/or waste collected during the cup forming process of 900 back to the process 700 for use in forming the low gloss unexpanded skin layer 504 and/or the expanded core layer 502 can be repeated one or more times.

The low gloss unexpanded skin layer 504 described herein provides a surface having a finish which can satisfy the desire for a low gloss or matte finish in the container industry and in particularly with respect to containers used in food service. When the low gloss unexpanded skin layer 504 has a gloss level of about 18 gloss units or less, the article is provided with a "paper-like" finish that has sufficient smoothness for printing on. The low gloss unexpanded skin layer 504 based on polyolefin resins as described herein can also provide sufficient strength and stiffness suitable for use in hot food service applications (such as hot beverages like tea and coffee), as well as provide the benefits of a low density and light weight material which provides good insulation.

One alternative method for providing a low gloss surface is to incorporate a filler, such as talc, calcium carbonate, or mica, for example. In general, as the amount of filler is increased, the gloss level decreases. However, increasing the filler loading can undesirably increase the density and/or weight of the final product. In addition, when the low gloss material is used to produce regrind that is used to form an expanded material, the increased filler loading can negatively effect the foam nucleation process, resulting in an expanded material that does not have the desired characteristics. Another alternative is to incorporate an elastomeric rubber material. However, this can reduce the flexural modulus and heat distortion temperature of a polypropylene-based expanded material, which can negatively effect the applicability of the material in hot food service applications. Alternative processes for decreasing the gloss of polymeric surfaces, such as texturizing the surface of the mold used to form an article are not applicable in the present case because the extrusion expansion process is a free surface process in which the skin layer is not in contact with a hard or cold surface.

In contrast, the embodiments of the present invention provide materials and processes for forming a multi-layer article having an unexpanded skin layer having a desired low gloss level that is useful for forming containers and in particular containers used in the food service industry, including both hot and cold materials. The materials useful in forming a low gloss unexpanded skin layer having a gloss level of about 18 gloss units or less are polypropylene-based resins which either alone or when blended with another polymeric material have a melt tangent delta in the range of 1-6 in combination with a melt complex viscosity in the range of 1980-12,000 Pa·sec. Suitable materials are further defined as having a melt flow rate of 2-10 g/10 min., a cross over point of melt elasticity modulus and loss modulus located between a frequency of 30-150 radians/second (rad/s) and 9,000-23,000 MPa, a flexural modulus greater than 1200 Mpa, and/or a melt strength of 6-40 cN.

The embodiments of the invention can provide a low gloss unexpanded skin layer with little to no filler or elastomeric rubber material provided in the skin layer, thus avoiding or minimizing the impact these materials can have on the skin layer, such as an increase in the density and/or weight of the layer and reductions in the flexural modulus and/or heat distortion temperature of the skin layer. In addition, increasing the amount of filler in the low gloss layer can negatively impact process control and product quality when the low gloss layer is used to form a regrind material that is used in a subsequent foaming process. For example, the regrind material having a high filler content can be difficult to use in forming an expanded material due to over nucleation and lack of uniformity in cell structure. The embodiments of the invention can avoid or minimize these effects by using little to no filler in the low gloss unexpanded skin layer.

In addition, the embodiments of the present invention can take advantage of using scrap and/or waste regrind in forming the low gloss unexpanded skin layer as well as when forming the multi-layer sheet having both an unexpanded and expanded layer made at least in part from regrind materials. As discussed above, both the unexpanded skin layer 504 and the expanded core layer 502 can be based on the same polyolefin resin, such as high melt strength polypropylene having long chain branching, an example of which is DAPLOY™ WB140, scrap and/or waste from the multi-layer sheet and any article formed from the multi-layer sheet, can be used to produce regrind that can subsequently be used to form an unexpanded and/or expanded layer of a new multi-layer sheet. As illustrated in Table 6, virgin and regrind material can be combined to form a low gloss unexpanded layer. See for example, Examples 17 and 22-24 of Table 6.

The embodiments of the invention described herein provide an expanded polypropylene container which can be used as an alternative to traditional expanded polystyrene containers. The multi-layer materials 300, 500 comprising an expanded core layer 302, 502 and at least one unexpanded skin layer 304, 504 can be used to form a container having the desirable characteristics typically associated with expanded polystyrene containers, such as uniform closed cells, flexibility and a cell size and density in the thickness direction that is similar to expanded polystyrene to minimize liquid leaching through the container walls.

Another potential feature of a container formed from the multi-layer materials 300, 500 described herein is that the article can be recycled. Recyclable means that a material can be added back into an extrusion or other process without segregation of components of the material, meaning that a container formed of the material does not have to be manipulated to remove one or more materials or components prior to re-entering the extrusion process. Because both the expanded core layer 302, 502 and unexpanded skin layer(s) 304, 504 of the multi-layer material 300, 500 are made from polypropylene-based materials, the containers made from such materials can be recycled and used to form regrind for use in forming new expanded core and/or unexpanded skin layers without having to segregate the components of the layers. In addition, containers made from the exemplary multi-layer materials can be recycled in existing polypropylene recycling facilities, which can often be more readily accessible to consumers than polystyrene recycling facilities.

The combination of the unexpanded skin layer 304, 504 co-extruded with the expanded core layer 302, 502 provides a container having an exterior surface (the unexpanded skin layer 304, 504) which can be directly printed on without the use of additional films or laminates which can separate from the container over time or under certain conditions. The co-extruded skin layer 304, 504 improves the strength of the container as well as provides an exterior surface layer that does not separate from the rest of the container. In addition, printing directly onto the co-extruded skin layer can save time and money by avoiding additional film and laminating steps. Avoiding the use of adhesive or tie layers between the unexpanded skin layer 304, 504 and expanded core layer 302, 502 can also reduce the risk of contamination during the polypropylene recycling process of the containers made from the multi-layer materials described herein.

The multi-layer materials 300, 500 described herein can also be used to form a two-piece cup having a stacking element 38 to facilitate de-nesting of stacked containers. Methods for providing a stacking feature in the lower portion of an expanded polystyrene cup typically include thermoforming or mechanically forming lugs in the peripheral wall of the container. These processes can damage the expanded polypropylene material used in the embodiments of the invention, which could result in leakage through the walls and seams of the container. The embodiments of the invention described herein use the bottom element 30 to provide the stacking element 38, without deforming or damaging the container peripheral wall 14. In addition, the use of a flat bottom-type design, in which the bottom element 30 has a slightly bowed or generally flat cross-section, instead of a pot-type or wet bottom design in which the cup bottom has a downward extending flange about which the bottom edge of the peripheral wall wraps around provides material and assembly cost savings.

To the extent not already described, the different features and structures of the various embodiments of the invention may be used in combination with each other as desired. That one feature may not be illustrated in all of the embodiments is not meant to be construed that it cannot be, but is done for brevity of description. Thus, the various features of the different embodiments may be mixed and matched as desired to form new embodiments, whether or not the new embodiments are expressly described.

While the invention has been specifically described in connection with certain specific embodiments thereof, it is to be understood that this is by way of illustration and not of limitation. Reasonable variation and modification are possible within the scope of the forgoing disclosure and drawings without departing from the spirit of the invention which is defined in the appended claims.

What is claimed is:

1. A co-extruded sheet comprising an extrusion having at least a first layer of an expanded foam material comprising a blend of a first high melt strength homopolymer or copolymer of polypropylene including long chain branching and having a melt strength of at least 20 cN and a second high melt strength homopolymer or copolymer of polypropylene, and a second layer of an unexpanded material comprising a third high melt strength homopolymer or copolymer of polypropylene having a melt strength of at least 20 cN,
   wherein the co-extruded sheet has a density of less than about 12.5 lb/ft$^3$.

2. The co-extruded sheet of claim 1 wherein the second high melt strength homopolymer or copolymer of polypropylene, the third high melt strength homopolymer or copolymer of polypropylene or both comprise a homopolymer or copolymer of polypropylene that is not cross-linked and does not include long chain branching.

3. The co-extruded sheet of claim 2 wherein the second high melt strength homopolymer or copolymer of polypropylene, the third high melt strength homopolymer or copolymer of polypropylene or both have a melting point of about 155-170° C.

4. The co-extruded sheet of claim 2 wherein the second high melt strength homopolymer or copolymer of polypropylene, the third high melt strength homopolymer or copolymer of polypropylene or both have a flexural modulus of at least 1400 MPa.

5. The co-extruded sheet of claim 2 wherein the second high melt strength homopolymer or copolymer of polypropylene, the third high melt strength homopolymer or copolymer of polypropylene or both have a melt flow rate in the range of 0.1-18 g/10 min. at 230° C. and 2.16 kg load.

6. The co-extruded sheet of claim 2 wherein the second high melt strength homopolymer or copolymer of polypropylene, the third high melt strength homopolymer or copolymer of polypropylene or both have a tensile strain of at least 70%.

7. The co-extruded sheet of claim 2 wherein the second high melt strength homopolymer or copolymer of polypropylene, the third high melt strength homopolymer or copolymer of polypropylene or both comprise an ethylene-propylene block copolymer.

8. The co-extruded sheet of claim 2 wherein the second high melt strength homopolymer or copolymer of polypropylene, the third high melt strength homopolymer or copolymer of polypropylene or both have a weight average molecular weight or number average molecular weight of at least 300,000 g/mol.

9. The co-extruded sheet of claim 1 wherein the second high melt strength homopolymer or copolymer of polypropylene, the third high melt strength homopolymer or copolymer of polypropylene or both comprise a homopolymer or copolymer of polypropylene that includes long chain branching.

10. The co-extruded sheet of claim 9 wherein the third high melt strength homopolymer or copolymer of polypropylene comprises a polypropylene-based block co-polymer or a polypropylene homopolymer.

11. The co-extruded sheet of claim 9 wherein the first high melt strength homopolymer or copolymer of polypropylene, the second high melt strength homopolymer or copolymer of polypropylene, the third high melt strength homopolymer or copolymer of polypropylene, or all three have a melting point of about 155-175° C.

12. The co-extruded sheet of claim 9 wherein the first high melt strength homopolymer or copolymer of polypropylene, the second high melt strength homopolymer or copolymer of polypropylene, the third high melt strength homopolymer or copolymer of polypropylene, or all three have a flexural modulus of at least 1400 MPa.

13. The co-extruded sheet of claim 9 wherein the first high melt strength homopolymer or copolymer of polypropylene, the second high melt strength homopolymer or copolymer of polypropylene or both have a melt flow rate in the range of 0.1-6 g/10 min. at 230° C. and 2.16 kg load.

14. The co-extruded sheet of claim 9 wherein the first high melt strength homopolymer or copolymer of polypropylene, the second high melt strength homopolymer or copolymer of polypropylene or both have a melt strength of at least 25 cN.

15. The co-extruded sheet of claim 9 wherein the first high melt strength homopolymer or copolymer of polypropylene, the second high melt strength homopolymer or copolymer of polypropylene, the third high melt strength homopolymer or copolymer of polypropylene, or all three have a polydispersity index (PDI) of at least 8.

16. The co-extruded sheet of claim 1 wherein the first layer comprises at least one nucleating agent and at least one blowing agent.

17. The co-extruded sheet of claim 1 wherein the second layer includes at least one additive to increase an opacity of the second layer.

18. The co-extruded sheet of claim 1 wherein the second layer is about 1-2 mils (0.02-0.05 mm) thick.

19. The co-extruded sheet of claim 1, further comprising a third layer co-extruded, extrusion coated, or laminated on a side of the first layer opposite the second layer.

20. The co-extruded sheet of claim 19 wherein the third layer comprises an unexpanded material comprising a fourth high melt strength homopolymer or copolymer of polypropylene that is not cross-linked and does not include long chain branching.

21. The co-extruded sheet of claim 20 wherein the third layer comprises an unexpanded material comprising a fourth high melt strength homopolymer or copolymer of polypropylene that includes long chain branching.

22. The co-extruded sheet of claim 1 wherein the first high melt strength homopolymer or copolymer of polypropylene of the first layer is different than the third high melt strength homopolymer or copolymer of polypropylene of the second layer.

23. The co-extruded sheet of claim 22 wherein the third high melt strength homopolymer or copolymer of polypropylene has a higher melt flow rate than the first high melt strength homopolymer or copolymer of polypropylene.

24. The co-extruded sheet of claim 1 wherein the co-extruded sheet is an extrusion coating.

25. An expanded foam container comprising:
a peripheral wall having an interior surface defining an interior cavity, an upper end defining an upper opening to the interior cavity and a lower end, opposite the upper end, defining a lower opening to the interior cavity; and
a bottom wall closing the lower opening, the bottom wall comprising a floor having an upper surface defining a bottom of the interior cavity and a lower surface;
wherein at least the sleeve comprises a co-extruded sheet having at least a first layer of an expanded foam material comprising a blend of a first high melt strength homopolymer or copolymer of polypropylene including long chain branching and having a melt strength of at least 20 cN and a second high melt strength homopolymer or copolymer of polypropylene, and a second layer of an unexpanded material comprising a third high melt strength homopolymer or copolymer of polypropylene having a melt strength of at least 20 cN;
wherein the co-extruded sheet has a density of less than about 12.5 lb/ft$^3$.

26. The expanded foam container according to claim 25 wherein the container comprises a cup.

27. The expanded foam container according to claim 26 wherein the upper end terminates in a rolled lip.

28. The expanded foam container according to claim 27 wherein the peripheral wall further comprises a stacking element having at least a portion located below the rolled lip.

29. The expanded foam container according to claim 28 wherein the stacking element comprises a shoulder in the peripheral wall, with the shoulder located below the rolled lip.

30. The expanded foam container according to claim 29 wherein the stacking element comprises a generally vertical portion of the peripheral wall between the rolled lip and the shoulder.

31. The expanded foam container according to claim 30 wherein the peripheral wall comprises-a-tapered portion extending from the shoulder to the bottom wall.

32. The expanded foam container according to claim 31 wherein the generally vertical portion has a taper that is less than the tapered portion.

33. The expanded foam container according to claim 25 wherein the bottom wall is formed separately from the peripheral wall.

34. The expanded foam container of claim 25 wherein the second high melt strength homopolymer or copolymer of polypropylene, the third high melt strength homopolymer or copolymer of polypropylene or both comprise a homopolymer or copolymer of polypropylene that is not cross-linked and does not include long chain branching.

35. The expanded foam container of claim 34 wherein the second high melt strength homopolymer or copolymer of polypropylene, the third high melt strength homopolymer or copolymer of polypropylene or both have a melting point of about 155-170° C.

36. The expanded foam container of claim 34 wherein the second high melt strength homopolymer or copolymer of polypropylene, the third high melt strength homopolymer or copolymer of polypropylene or both have a flexural modulus of at least 1400 MPa.

37. The expanded foam container of claim 34 wherein the second high melt strength homopolymer or copolymer of polypropylene, the third high melt strength homopolymer or copolymer of polypropylene or both have a melt flow rate in the range of 0.1-18 g/10 min. at 230° C. and 2.16 kg load.

38. The expanded foam container of claim 34 wherein the second high melt strength homopolymer or copolymer of polypropylene, the third high melt strength homopolymer or copolymer of polypropylene or both have a tensile strain of at least 70%.

39. The expanded foam container of claim 34 wherein the second high melt strength homopolymer or copolymer of polypropylene, the third high melt strength homopolymer or copolymer of polypropylene or both comprise an ethylene-propylene block copolymer.

40. The expanded foam container of claim 34 wherein the second high melt strength homopolymer or copolymer of polypropylene, the third high melt strength homopolymer or copolymer of polypropylene or both have a weight average molecular weight or number average molecular weight of at least 300,000 g/mol.

41. The expanded foam container of claim 25 wherein the second high melt strength homopolymer or copolymer of polypropylene, the third high melt strength homopolymer or copolymer of polypropylene or both comprise a homopolymer or copolymer of polypropylene that includes long chain branching.

42. The expanded foam container of claim 41 wherein the third high melt strength homopolymer or copolymer of polypropylene comprises a polypropylene-based block copolymer or a polypropylene homopolymer.

43. The expanded foam container of claim 41 wherein the first high melt strength homopolymer or copolymer of polypropylene, the second high melt strength homopolymer or copolymer of polypropylene, the third high melt strength homopolymer or copolymer of polypropylene, or all three have a melting point of about 155-175° C.

44. The expanded foam container of claim 41 wherein the first high melt strength homopolymer or copolymer of polypropylene, the second high melt strength homopolymer or copolymer of polypropylene, the third high melt strength homopolymer or copolymer of polypropylene, or all three have a flexural modulus of at least 1400 MPa.

45. The expanded foam container of claim 41 wherein the first high melt strength homopolymer or copolymer of polypropylene, the second high melt strength homopolymer or copolymer of polypropylene or both have a melt flow rate in the range of 0.1-6 g/10 min. at 230° C. and 2.16 kg load.

46. The expanded foam container of claim 41 wherein the first high melt strength homopolymer or copolymer of polypropylene, the second high melt strength homopolymer or copolymer of polypropylene or both have a melt strength of at least 25 cN.

47. The expanded foam container of claim 41 wherein the first high melt strength homopolymer or copolymer of polypropylene, the second high melt strength homopolymer or copolymer of polypropylene, the third high melt strength homopolymer or copolymer of polypropylene, or all three have a polydispersity index (PDI) of at least 8.

48. The expanded foam container of claim 25 wherein the first layer comprises at least one nucleating agent and at least one blowing agent.

49. The expanded foam container of claim 25 wherein the second layer includes at least one additive to increase an opacity of the second layer.

50. The expanded foam container of claim 25 wherein the second layer is about 1-2 mils (0.02-0.05 mm) thick.

51. The expanded foam container of claim 25, wherein the co-extruded sheet further comprises a third layer co-extruded, extrusion coated, or laminated on a side of the first layer opposite the second layer.

52. The expanded foam container of claim 51 wherein the third layer comprises an unexpanded material comprising a fourth high melt strength homopolymer or copolymer of polypropylene that is not cross-linked and does not include long chain branching.

53. The expanded foam container of claim 51 wherein the third layer comprises an unexpanded material comprising a fourth high melt strength homopolymer or copolymer of polypropylene that includes long chain branching.

54. The expanded foam container of claim 25 wherein the first high melt strength homopolymer or copolymer of polypropylene of the first layer is different than the third high melt strength homopolymer or copolymer of polypropylene of the second layer.

55. The expanded foam container of claim 54 wherein the third high melt strength homopolymer or copolymer of polypropylene has a higher melt flow rate than the first high melt strength homopolymer or copolymer of polypropylene.

56. The expanded foam container of claim 25 wherein the co-extruded sheet is an extrusion coating.

57. The expanded foam container of claim 25 wherein the second layer is extrusion coated on a first side of the first layer.

58. A co-extruded sheet comprising:
a first extrudate layer of an expanded foam material comprising a blend of a first high melt strength homopolymer or copolymer of polypropylene including long chain branching and having a melt strength of at least 20 cN and a second high melt strength homopolymer or copolymer of polypropylene; and
a second extrudate layer of an unexpanded material comprising a third high melt strength homopolymer or copolymer of polypropylene having a melt strength of at least 20 cN;
wherein the first and second extrudate layers are in overlying relationship and wherein the co-extruded sheet has a density of less than about 12.5 lb/ft$^3$.

59. The co-extruded sheet of claim 58 wherein the co-extruded sheet is an extrusion coating.

* * * * *